United States Patent
Krishnakumar et al.

(10) Patent No.: US 11,435,810 B1
(45) Date of Patent: Sep. 6, 2022

(54) INFORMATION HANDLING SYSTEM AND PERIPHERAL BI-DIRECTIONAL WAKEUP INTERFACE

(71) Applicant: Dell Products L.P., Round Rock, TX (US)

(72) Inventors: Karthikeyan Krishnakumar, Austin, TX (US); Minho Cheong, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/212,860

(22) Filed: Mar. 25, 2021

(51) Int. Cl.
*G09G 5/00* (2006.01)
*G06F 1/3234* (2019.01)
*G06F 1/26* (2006.01)

(52) U.S. Cl.
CPC ............ *G06F 1/3259* (2013.01); *G06F 1/266* (2013.01)

(58) Field of Classification Search
CPC ...... G06F 1/3259; G06F 1/266; G06F 9/4418; G05B 2219/25236; G05B 2219/25279; G05B 2219/25286; G05B 2219/15117; G05B 2219/25187; G05B 2219/25196; G05B 2219/33192; G05B 2219/33207
See application file for complete search history.

(56) References Cited

U.S. PATENT DOCUMENTS

| | | | |
|---|---|---|---|
| 10,045,295 B2 | 8/2018 | Kim et al. | |
| 10,165,513 B1 | 12/2018 | Gorbachov | |
| 2006/0084383 A1 | 4/2006 | Ibrahim et al. | |
| 2016/0198409 A1 | 7/2016 | Chakraborty | |
| 2018/0018185 A1* | 1/2018 | Sun ................... | H04W 52/0235 |
| 2020/0205078 A1 | 6/2020 | Balmelli et al. | |

FOREIGN PATENT DOCUMENTS

| | | | |
|---|---|---|---|
| CN | 104798410 B | 7/2015 | |
| CN | 110364151 A | 10/2019 | |
| WO | WO-2012010676 A1 * | 1/2012 | ........... H04B 13/005 |

* cited by examiner

*Primary Examiner* — Adam R. Giesy
(74) *Attorney, Agent, or Firm* — Zagorin Cave LLP; Robert W. Holland

(57) ABSTRACT

An information handling system wirelessly interfaces with a peripheral device, such as a keyboard or mouse, through a primary radio and communication protocol, such as Bluetooth. A secondary radio interfaces with the primary radio to provide a low power wake and sleep using a wake signal sent between the secondary radios. An information handling system may wake the peripheral, such as at system power up, or the peripheral may wake the information handling system, such as at detection of an input at the peripheral for communication to the information handling system.

20 Claims, 17 Drawing Sheets

EXAMPLES OF TIME DOMAIN OVERLAP BETWEEN TX/RX

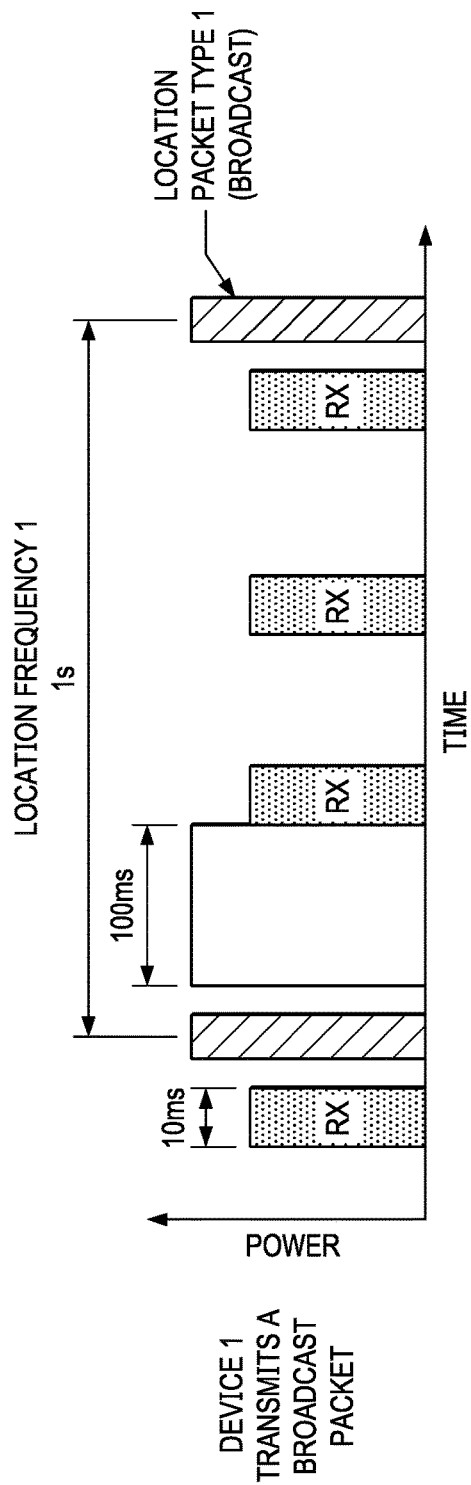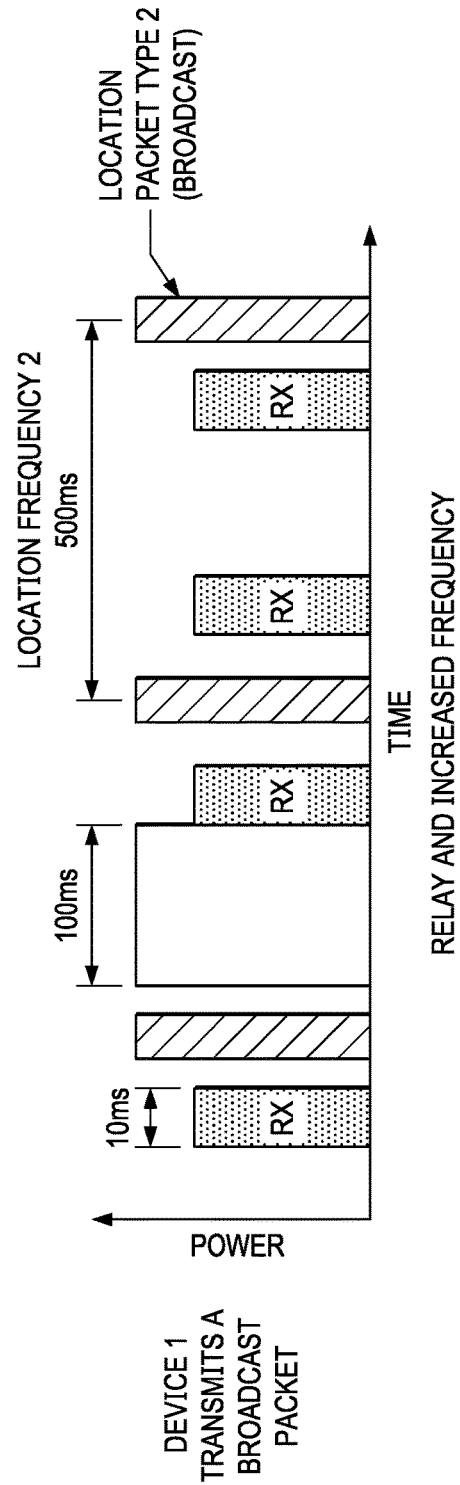
FIG. 11A
FIG. 11B

INFORMATION HANDLING SYSTEM AND PERIPHERAL BI-DIRECTIONAL WAKEUP INTERFACE

CROSS REFERENCE TO RELATED APPLICATION

This application is related to U.S. patent application Ser. No. 17/212,855, filed Mar. 25, 2021, entitled "Information Handling System and Peripheral Wakeup Radio Interface Configuration" by inventors, Karthikeyan Krishnakumar and Minho Cheong, and is incorporated by reference in its entirety.

This application is related to U.S. patent application Ser. No. 17/212,848, filed Mar. 25, 2021, entitled "Information Handling System and Peripheral Group Wakeup Radio Interface Synchronized Communications" by inventors, Karthikeyan Krishnakumar and Minho Cheong, and is incorporated by reference in its entirety.

This application is related to U.S. patent application Ser. No. 17,212,844, filed Mar. 25, 2021, entitled "Information Handling System and Peripheral Wakeup Radio Interface Synchronized Communications" by inventors, Karthikeyan Krishnakumar and Minho Cheong, and is incorporated by reference in its entirety.

This application is related to U.S. patent application Ser. No. 17/212,826, filed Mar. 25, 2021, entitled "Information Handling System Location Wakeup Radio Interface Synchronized Communications" by inventors, Karthikeyan Krishnakumarpgl and Minho Cheong, and is incorporated by reference in its entirety.

BACKGROUND OF THE INVENTION

Field of the Invention

The present invention relates in general to the field of information handling system peripheral interactions, and more particularly to an information handling system and peripheral bi-directional wakeup interface.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Although integrated keyboards, touchpads and displays provide a convenient end user interface at portable systems, end users often prefer to interface with the information handling systems using peripheral devices. Often wireless peripheral devices provide the greatest convenience for end users by having the peripheral devices separate from the information handling system without any cable connections. A variety of wireless interfaces support peripheral interactions including WiFi, BLUETOOTH and more recently BLUETOOTH LOW ENERGY (BLE). BLE operates in the 2.4 GHz range similar to WiFi and BLUETOOTH, but sends user data at defined connection intervals, such as between 10 msec and 4 seconds. By breaking up user data into packets sent at connection intervals, the radio tends to use less energy both because of less frequent transmissions and because the radio tends to heat less and operate more efficiently at lower temperatures. BLE radios exchange pairing information in an advertisement and connection process defined by the BLE standard and then connect at the defined interval by reference to a clock associated with each radio that synchronizes communication. In situations where the amount of user data is relatively small, such as with keyboard and mouse inputs, BLE peripherals provide a low power consumption wireless interface. When greater amounts of data are transferred, such as with audio or visual information for speakers and displays, other types of interfaces may be used, such as BLUETOOTH, BLE 5.2 and WiFi or newer higher frequency radios that operate in the 60 GHz region.

Information handling systems communicate with wireless peripherals through radios that can be integrated internally or coupled as a dongle to a USB port. Generally to improve battery life, peripheral devices monitor end user activity and transition to a sleep state after a defined period of inactivity, such as three minutes. During the sleep state radio transmissions are typically terminated and the peripheral radio is powered down so that communications with an information handling system stop. Once activity is detected, such as by a press at a keyboard key or movement of a mouse, the radio is awakened and communication with the information handling system is restarted, such as with standards-defined advertisement and reconnection. During the reconnection process an end user may experience a brief delay as the information handling system recognizes the peripheral and re-establishes synchronized communications. One difficulty with this reconnection process is that it is uni-directional. That is, a peripheral can reconnect to an information handling system when the information handling system has the radio on, however, the information handling system cannot connect to the peripheral since the peripheral radio is off. Another difficulty is that end user interactions with a peripheral cannot awaken an information handling system when the information handling system radio is off. Since many portable information handling systems run on battery charge, leaving a radio on when peripherals are inactive can tend to reduce battery life. By comparison, when peripherals interface by a cable, end user inputs to the peripheral can generate an interrupt that awakens the information handling system. This USB wake is generally limited to a small number of devices that generally must be armed before the information handling system sleeps. Human interface devices (HID), such as a keyboard and mouse, generally must be defined by the operating system, such as WINDOWS, as wake capable devices in order to armed before sleep so that the wake up function is limited by both device and operating system support. In a typical use case, wireless peripherals take several extra end user interactions to establish an operational state, such as starting the information handling system and making inputs at the peripherals.

Another class of device that uses low energy wireless interfaces to communicate is Internet of Things (IoT) devices. IoT devices typically use BLE to alternate between sleep and wake modes for sensing and reporting conditions. For instance, an IoT temperature sensor typically wakes at regular intervals to measure temperature and transmit the temperature to an IoT gateway that forwards the temperature to a central network location. Often both the IoT sensor and gateway operate on battery power so that low power sleep modes are used to extend the device battery life. In the low power mode, a processor, such as a system on chip (SOC), operates like a state machine that wakes at intervals to handle events. Although IoT devices are useful and inexpensive tools for monitoring conditions, during the sleep state the devices typically cannot interact. Thus, when deployed and operational the IoT devices cannot typically initiate communications until a timed interval arrives.

SUMMARY OF THE INVENTION

Therefore, a need has arisen for a system and method which supports low power bi-directional peripheral wake-up interfaces between peripherals and with information handling systems.

In accordance with the present invention, a system and method are provided which substantially reduce the disadvantages and problems associated with previous methods and systems for reducing power consumption while monitoring peripheral wireless interactions. A wireless interface module includes a primary radio having a primary protocol communication that communicates user data and a secondary radio having a wake protocol communication that communicates system and/or peripheral power states. Wake commands between peripherals and information handling systems trigger a transition from a low power state having the secondary radio active to an on state having a primary radio active, such as by sending a signal from the secondary radio to a GPIO of a processing resource when a wake command is received at the secondary radio.

More specifically, an information handling system interfaces with plural peripherals through a wireless interface module, such as WiFi, BLUETOOTH and/or BLE, supported by primary radio communicating wireless signals by a user data protocol. A secondary radio interfaces with a GPIO of a processing resource that manages the primary radio to selectively wake the primary radio from a low power state in response to a wake command received at the secondary radio as a wireless signal communicated by a wake protocol, such as a packet including pairing information and send with OOK or ASK formats. The secondary radio minimizes power consumption when in the low power mode by limiting a need for processing resources when monitoring for the wake command, such as by limiting the function of the secondary radio to listening only for the wake command as stored in the secondary radio before the low power mode. Alternatively, the secondary radio can include an additional limited number of preprogrammed commands, such as commanding a sleep mode, providing an acknowledgement and relaying wake protocol commands to other peripherals. As an example, each command may be included in a register of the secondary radio and referenced by a comparator as wireless signals are received so that a match results in a GPIO signal sent to a processing resource that can wake the primary radio or leverage the secondary radio as desired, such as to relay wake commands. The wireless interface module supports peripherals ranging from keyboards and mice that use BLE, speakers that use BLUETOOTH, displays that use WiFi and location peripherals that transmit location beacons with BLE.

The present invention provides a number of important technical advantages. One example of an important technical advantage is that wireless peripherals interface with an information handling system with a bi-directional low power mode that allows end user interactions at an information handling system wake peripherals and vice versa. For instance, if a user presence detection (UPD) device at an information handling system, such as a time of flight sensor or camera, detects an end user, a wake command from the information handling system to the peripherals allows the peripherals to establish an interface with the primary radio so as to be ready to accept end user inputs before the end user interacts with the peripherals. Similarly, at start up the information handling system initiates peripheral interactions to have the peripherals prepared for interactions when the information handling system is operational. In an off state, power consumption at the peripherals and information handling system is reduced so that monitoring of a wake command by a secondary radio allows peripherals to wake an information handling system. Further, relay of the wake command across a group of peripheral or an area allows an end user to bring an entire desktop to an operational state with a single interaction at either a peripheral or the information handling system. The low power state provided by the secondary radio enhances low power monitoring for location peripherals by enhancing battery life and providing a greater population of other peripheral devices that can detect and relay location beacons transmitted by location peripheral devices. For example, power consumption of a secondary radio monitoring for a wake command may be as low as 10 microWatts.

Another important advantage is that low power devices that only communicate at intervals, such as IoT devices, may also wake between intervals to establish communication. This allows greater flexibility for contacting IoT devices in the field, such as to obtain intermediate sensor measurements and to perform maintenance, such as firmware updates. In addition, power use may be further reduced by relaying on the low power of the wakeup radio to monitor the sleep state instead of a sleep state of the SOC or other hardware.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 11A and 11B depict examples of broadcast packets associated with a location peripheral device;

DETAILED DESCRIPTION

A wake-up radio manages power states of an information handling system and peripherals through a wake-up protocol separate from wireless networking protocols, such as BLUETOOTH and WiFi. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
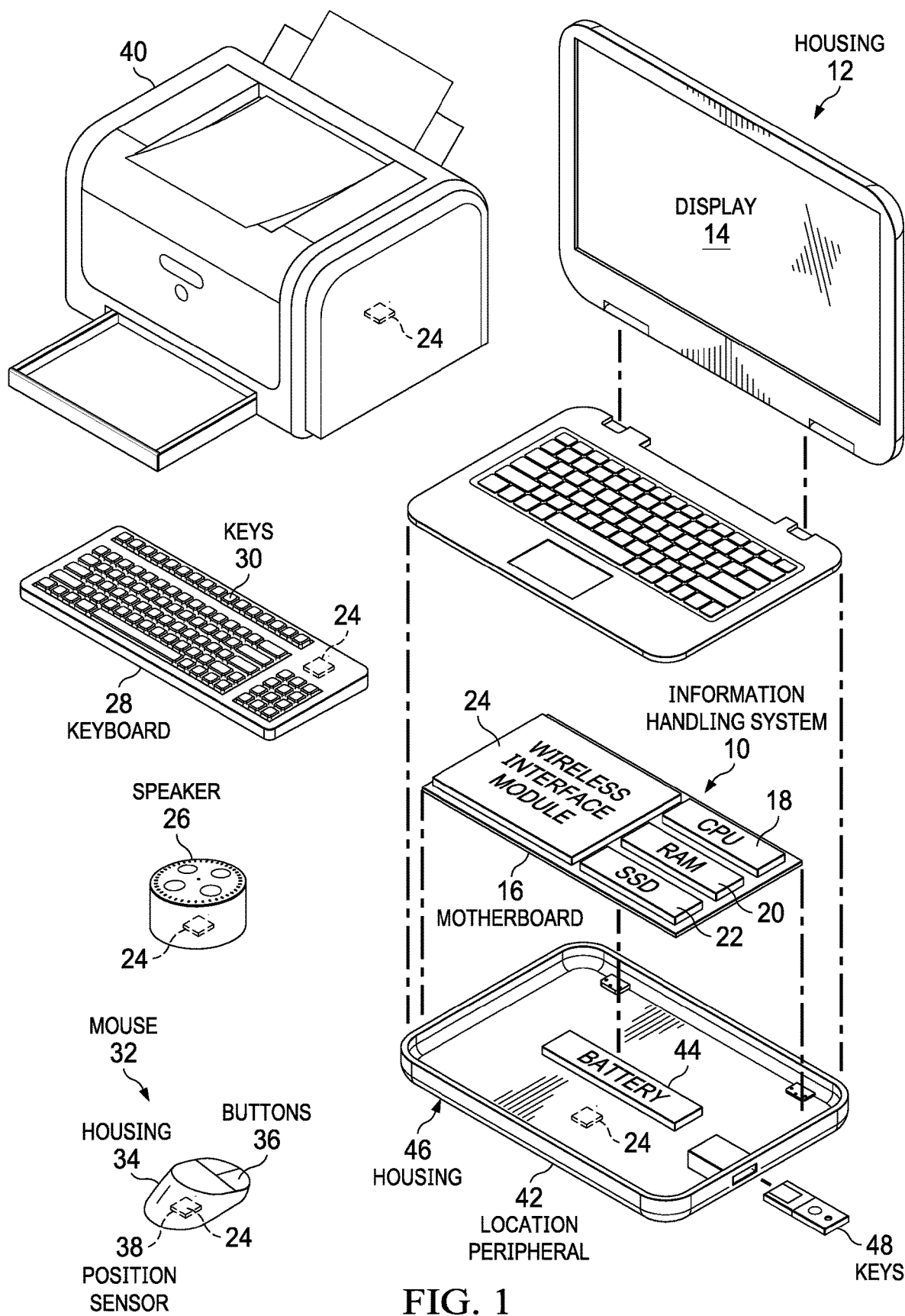
FIG. 1 depicts a portable information handling system having wireless network interfaces with plural different types of peripheral devices.

Referring now to FIG. 1, a portable information handling system 10 is depicted having wireless network interfaces with plural different types of peripheral devices. In the example embodiment, portable information handling system 10 is built in a portable housing 12 that integrates a display 14 in a lid portion rotationally coupled to a main portion having processing components that cooperate to process information. For example, a motherboard 16 couples to housing 12 and interfaces processing components to support information processing. A central processing unit (CPU) 18 executes instructions to process information with the instructions and information stored in a random access memory (RAM) 20. A solid state drive (SSD) 22 provides persistent storage of instructions and information, such as an operating system and applications that are retrieved at runtime to RAM 20 for execution on CPU 18. A wireless interface module 24 interfaces with CPU 18 to provide wireless communications for portable information handling system 10 with external devices and networks. For example, wireless interface module 24 supports wireless communication through wireless local area networks (WLAN), such as IEEE 802.11 (b, g and n) WiFi networks, through wireless personal area networks (WPAN), such as BLUETOOTH and BLE, or through other types of user data wireless interfaces that communication through shared public radio bands having channels in the 2.4 to 5 GHz frequency ranges. Although the example embodiment depicts a portable information handling system, other types of housing configurations may be used, such as desktop and server configurations.

In the example embodiment, a variety of peripherals are depicted that communicate with portable information handling system 10 through their own wireless interface modules 24, such as with WLAN or WPAN communications. A speaker 26 receives audible information through WLAN or WPAN wireless signals to play audible information as sounds. A keyboard 28 accepts inputs at keys 30 and communicates the inputs to portable information handling system 10 through WLAN or WPAN wireless signals for use as inputs. Similarly, a mouse 32 has a housing 34 that moves to allow position sensing by a position sensor 38 and to accept inputs at buttons 36 as inputs to portable information handling system 10 communicated through an integrated wireless interface module 24. In the example of keyboard 28 and mouse 32, communication is often performed with BLUETOOTH LOW ENERGY (BLE), which uses periodic communication intervals to help reduce power consumption. For instance, communication by the BLE protocol with periodic interval connections reduces power by reducing temperatures generated by the radio transmitter. A printer 40 includes a wireless interface module 24 to receive print jobs from portable information handling system 10. A location peripheral 42 includes a wireless interface module 24 in a housing 46 that runs in a low power mode on a battery 44 to provide intermittent communications as an aid for location of an attached item, such as keys 48. For instance, location peripheral 42 is a TILE or similar product that helps track locations based upon the location of an information handling system that detects wireless signals and reports a position of the information handling system to a server or other network location when location peripheral 42 wireless signals are detected. One advantage of using a secondary radio in the location peripheral is that other peripheral devices, not just information handling systems, can track location beacon reports, such as by relaying the beacons to host devices. Location peripheral 42 is one example of an IoT device, other examples might include temperature or humidity sensors that integrate a BLE system on chip.

One difficulty with peripheral wireless communication interfaces to an information handling system is that a radio on both systems has to be simultaneously active to establish user data communication. Arranging simultaneous radio communication generally means increased power consumption at both the information handling system and peripheral, which can impact battery charge life. When battery power consumption becomes excessive, the radios are typically shut off so that end user interaction is required to wake the device. To achieve reduced power consumption, each wireless interface module 24 includes both a primary radio that supports WLAN and/or WPAN protocol wireless communications and a low power secondary radio that supports wake and sleep coordination. The secondary radio has minimal logical functions to support wake and sleep wireless commands that, when detected, wake the primary radio and its associated processing resource, such as by setting a GPIO signal high to the processing resource. The low power sleep state provided by the secondary radio allows peripherals to wake each other and an information handling system with minimal impact on battery charge. For example, an end user might make an input with a mouse or keyboard to activate the secondary radio and in turn wake the information handling system through its secondary radio. Conversely, the information handling system may power up and use the secondary radio to awaken the keyboard and mouse so that the system as a whole is more quickly ready to interact with the end user. Although the example embodiment relates to peripheral devices, alternative embodiments may include IoT devices, such as an IoT temperature sensor or gateway hub. IoT implementations may use the hardware and software solutions described below for peripheral devices.

Figure 2:
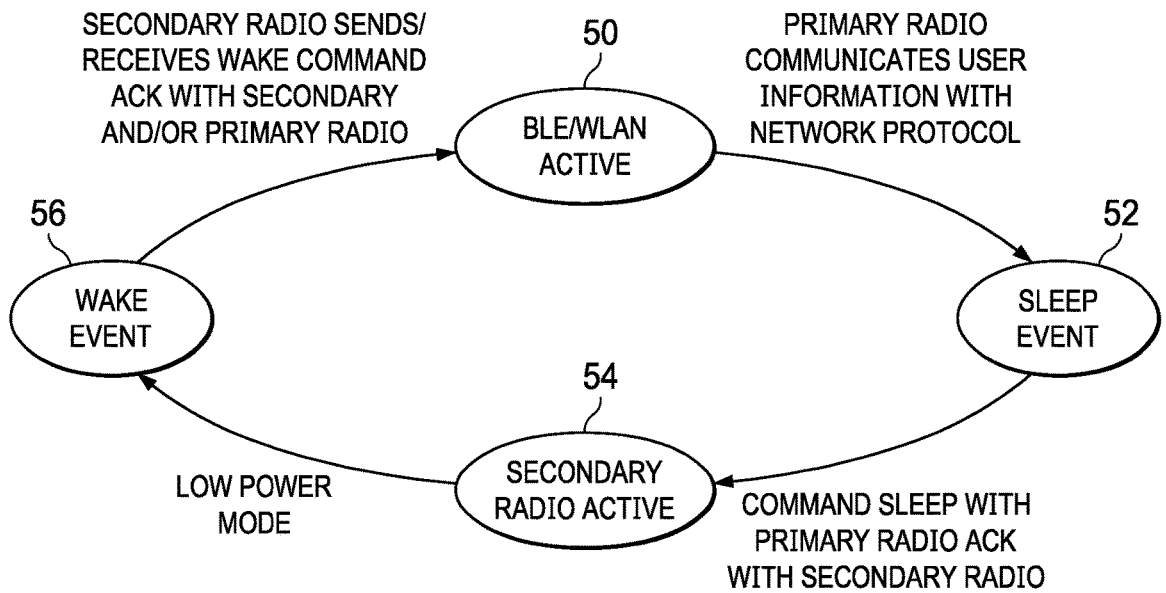
FIG. 2 depicts a state diagram of one example for power state transitions based upon primary and secondary radio operations.

Referring now to FIG. 2, a state diagram depicts one example for power state transitions based upon primary and secondary radio operations. At an initial state 50, the primary radio is active to communicate user data through a network protocol, such as a WLAN or WPAN like BLUETOOTH. At state 52 a sleep event is determined, such as a command to power down or a predetermined idle time at an information handling system or peripheral. At the sleep event, a command to sleep is communicated with the primary radio to other primary radios of associated devices and the secondary radio is activated to receive an acknowledgement sent by the associated device. As is described below in greater detail, associations may be between information handling systems and one or more peripheral devices as well as between peripheral devices. For example, a keyboard might control power state at a mouse and vice versa. At state 54, the secondary radio is activated and sends an acknowledgement so that the primary radios on both devices may be powered down to a low power mode. In the low power mode, the device may monitor for wake events, such as an input or power button press that wakes the processing resource, such as with an input at a GPIO. If a wake event is detected, the signal may also command a transmission of a wake command from the secondary radio to command a wake of other associated secondary radios of other associated devices. Similarly, in the low power mode when the secondary radio receives a wake command it initiates a wake of the processing resource by an input to a GPIO. At the wake event state 56, the processing resource transitions the secondary radio to an off state and the primary radio to an on state. If the wake command is received by the secondary radio, an acknowledgement may be transmitted by the secondary radio or by the primary radio after the secondary radio is powered off. Similarly, when a secondary radio transmits the wake command, the processing resource may wait for an acknowledgment on the secondary radio or may transition to the primary radio.

Figure 3:
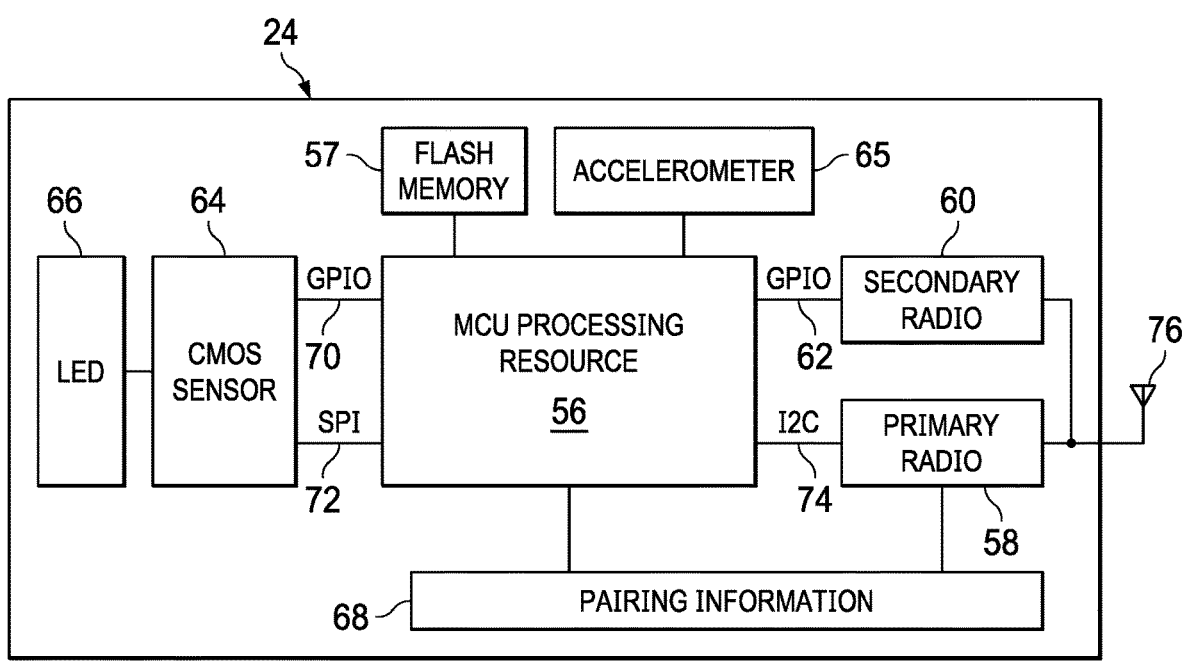
FIG. 3 depicts a block diagram of a wireless interface module having wake and sleep states supported by primary and secondary radios.

Referring now to FIG. 3, a block diagram depicts a wireless interface module 24 having wake and sleep states supported by primary and secondary radios. Wireless interface module 24 provides a bi-directional wake-up using a shared radio infrastructure to communicate user data and wake commands between associated devices so that independent events on the associated devices initiates a wake and/or sleep state on the associated devices. Essentially, a parasite radio dedicated to wake-up command sharing in a same frequency band as a main radio reduces power consumption during low power states. In the example embodiment, a processing resource 56 is provided by a microcontroller unit (MCU) that executes instructions to manage a primary radio 58 and secondary radio 60. Primary radio 58 communicates user data through user data protocols, such as WPAN and WLAN protocols. Secondary radio 60 communicates wake protocol commands that sleep and wake wireless interface module 24. In the example embodiment, both primary radio 58 and secondary radio 60 transmit and receive in the 2.4 GHz band through a shared antenna 76. For example, primary radio 58 supports BLE protocol communication at defined intervals and secondary radio 60 is programmed by processing resource 56 at entry to a sleep state to monitor a defined channel in the 2.4 GHz range for communication of wake commands. A flash memory 57 stores instructions for execution on processing resource 56 that manages user data communications and programs secondary radio to manage wake commands in the low power state. Pairing information 68 is defined by processing resource 56 to define BLE or other protocol communications and stored in RAM or flash memory. Although the processing resource 56 is depicted as a separate element from flash memory 57 and primary radio 58, a system on chip (SOC) or similar architecture may combine these elements in one integrated circuit. In the example embodiment, an accelerometer 65 senses accelerations, a CMOS sensor 64 senses light, such as for power, and an LED 66 provides a visual indication of the operational state of wireless interface module 24. Component interactions and programming may be supported through a number of interfaces, such as SPI links 72 and I2C links 74.

In operation, wireless interface module 24 powers up primary radio 58 when a need arises to transmit or receive user data and sleeps primary radio 58 during idle periods. Secondary radio 60 wakes when primary radio 58 sleeps so that low power is expended when listening for a wake command. If a wake command is detected, secondary radio 60 issues a wake signal through GPIO 62 that wakes processing resource 56 to initiate a wake of primary radio 58 and sleep of secondary radio 60. A GPIO 70 interface between processing resource 56 and CMOS sensor 64 allows a local input to wake processing resource 56 so that it can command secondary radio 60 to send a wake command. Similarly, an acceleration sensed by accelerometer 65 may wake processing resource 56 to initiate a transmission of a wake command by secondary radio 60. In one embodiment, secondary radio 60 communicates only the wake protocol, such as only transmitting and receiving wake and sleep commands. The wake protocol may be provided with a simple modulation scheme that is readily recognized by a comparator of secondary radio 60, such as modulation of some portion of pairing information 68 with an On-Off Keying (OOK) or Amplitude-Shift Keying (ASK) modulation scheme in a defined channel, such as within a narrow bandwidth of less than 100 KHz. With just the secondary radio 60 active, power consumption of less than 10 microWatts may be achieved.

A variety of power efficiencies may be accomplished with the primary and secondary radios. For instance, a shared antenna 76 reduces the component size and expense. Similarly, a shared crystal may provide both radios with accurate frequency control. Secondary radio 60 provides an attractive low power solution without a processing resource, such as by pre-programming wake and sleep commands in an internal register for comparison against detected incoming signals with an internal comparator. Wake and sleep commands defined by the wake protocol may be selected to enhance efficient transmission and reception, such as with lower data rates and unique preambles. In one alternative embodiment, to help promote backwards compatibility primary radio 58 may be selectively re-programmed to perform functions of secondary radio 60. For example, if an information handling system having a conventional wireless interface that supports BLE interfaces with a peripheral having a wireless interface module and secondary radio, the wake protocol may be programmed into primary radio 58 when the peripheral goes to a low power state and returned to the BLE protocol when the peripheral wakes.

Figure 4:
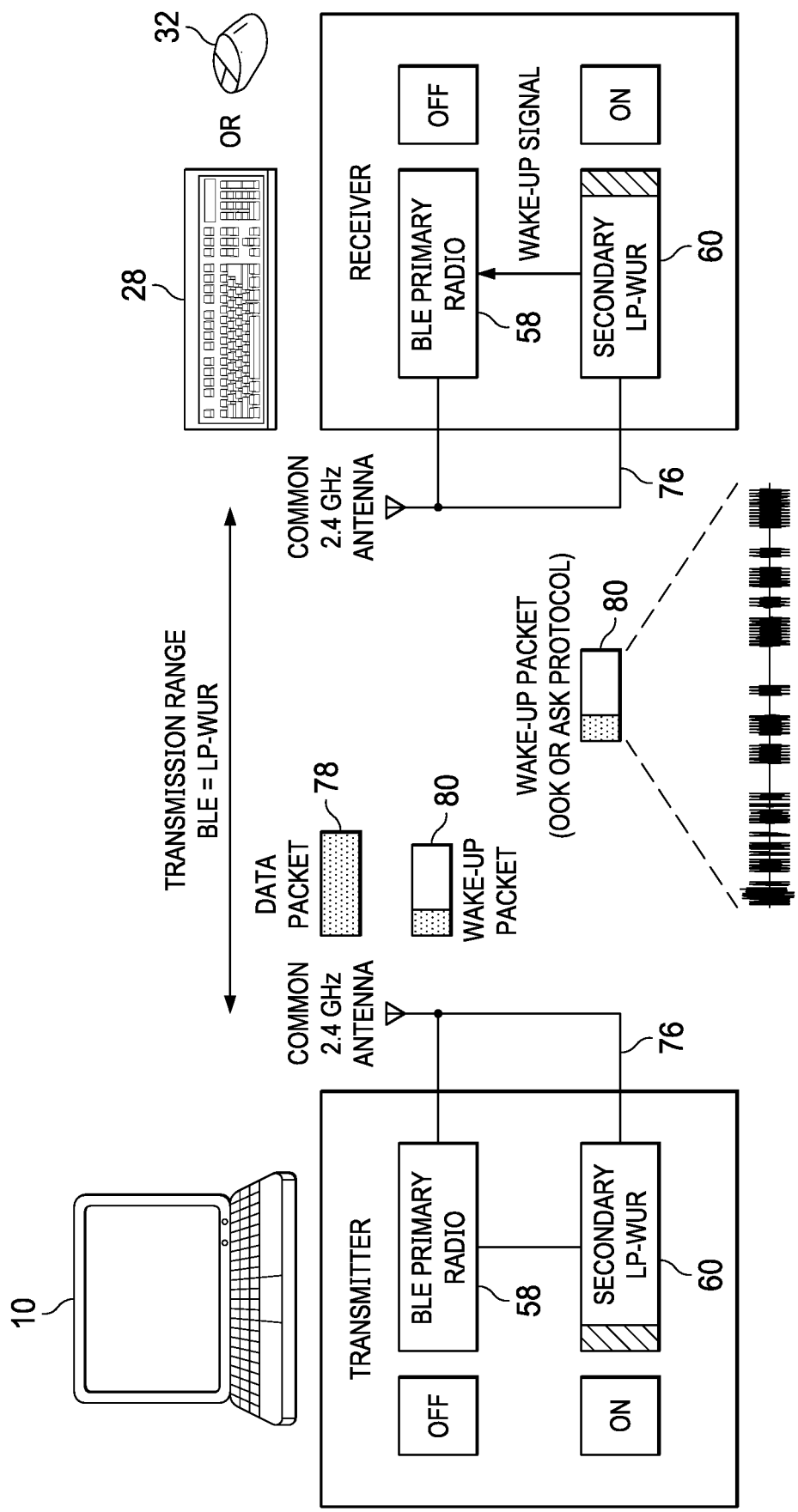
FIG. 4 depicts a block diagram of secondary radio protocol communications between an information handling system and a peripheral, such as a keyboard or mouse.

Referring now to FIG. 4, a block diagram depicts secondary radio protocol communications between an information handling system 10 and a peripheral, such as a keyboard 28 or mouse 32. During normal operations, primary radios 58 communicate through a user data protocol, such as BLE, with user data packets 78 using parameters set in part by the transmission range between information handling system 10 and the peripherals. For example, primary radio 58 sets a transmit power that varies based on signal strength (RSSI) at each primary radio. At a predetermined condition, such as an idle time in which no end user interactions are detected, the peripheral device transmits to information handling system 10 through user data with the BLE protocol a sleep command to indicate entry to a sleep state of primary radio 58. The peripheral then sleeps primary radio 58 and wake secondary radio 60 to listen for an acknowledgement. Information handling system 10 upon receiving the sleep command sleeps its primary radio 58 and wakes its secondary radio 60 to acknowledge the sleep command. Note that the sleep may be commanded from the information handling system 10 to the peripherals, such as at shutdown of information handling system 10. Further, when information handling system 10 has external power, it may elect to have both the primary and secondary radios remain powered up.

After both primary radios 58 are powered off, low power wake-up secondary radios 60 monitor a preprogrammed radio channel for a defined wake command, such as an OOK or ASK modulated signal that includes pairing information of the primary radio user data protocol, such as a BLE MAC address of a paired device. A wake-up packet 80 formatted with the wake protocol is transmitted by a first secondary radio 60 upon a wake event, such as a power up of information handling system 10 or an input at mouse 32 or keyboard 28, and received by the second secondary radio 60. At transmission of the wake command, the first secondary radio 60 wakes its primary radio 58 and at receipt of the wake command the second secondary radio 60 wakes its primary radio 58. In the example embodiment, the wake command provides a unique preamble, a MAC header for the receive address and a frame body to provide a frame check sequence. Preprogrammed frequency channel, pairing information and protocol selections allow the wake command monitoring to consume a minimal amount of power. In addition, the RSSI determined transmission range from user data communications may be applied to set a transmission strength and data transmission length of the wake command. Slow data rates tend to increase secondary radio range while also increasing the amount of time need to communicate the wake command.

Referring now to FIGS. 5A, 5B, 5C, 5D, 5E and 5F, flow diagrams depict a process for setting up and monitoring wake commands between low power wake-up secondary radios. The process starts at step 82 of FIG. 5A with a host device, such as an information handling system, in an always-listen mode for pairing advertisement and continues to step 84 to determine if an advertisement packet is received. At a client device, such as a peripheral, the process starts at step 86 with the device placed in a pairing mode and continues to step 88 to broadcast advertisement packets. At step 90 a determination is made of whether a pairing initiation is made from the host and, if not the process returns to step 88 to continue advertisement. At step 92 and 94 a pairing sequence is initiate for the host and device by exchange of BLE keys. At step 96 and 98 a BLE session is established between the host and device, such as in accordance with the BLE standards. Once the BLE session is established, the process continues to step 100 and 102 for the host and device to exchange wake-up capabilities. At steps 102 and 104, each device determines if a wake-up capability exists and, if so, the process continues to step 106 of FIG. 5B. If a wake-up capability does not exist, the process continues to step 132 of FIG. 5C.

Figure 5A:
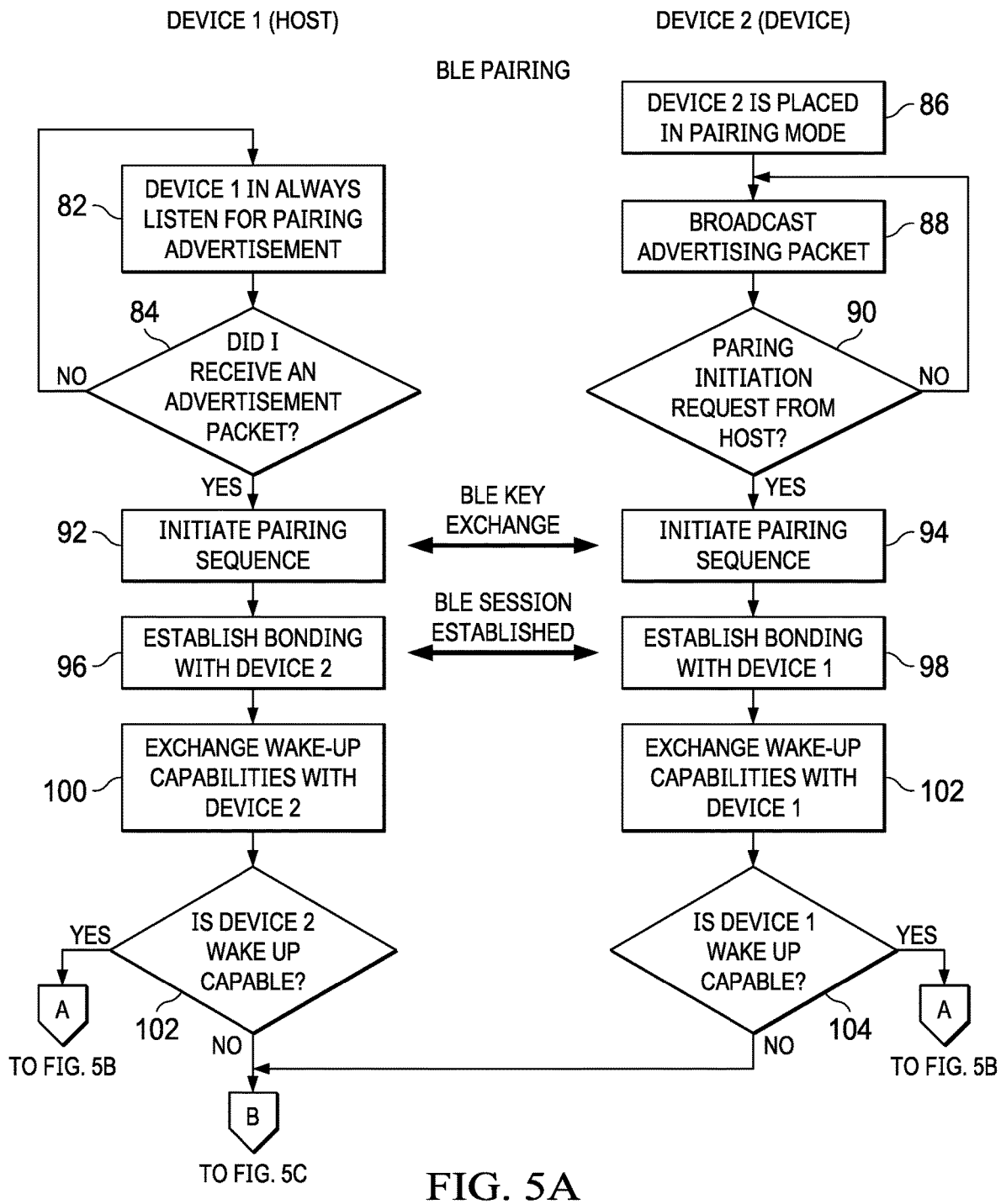
FIGS. 5A, 5B, 5C, 5D, 5E and 5F depict flow diagrams of a process for setting up and monitoring wake commands between low power wake-up secondary radios.
Figure 5B:
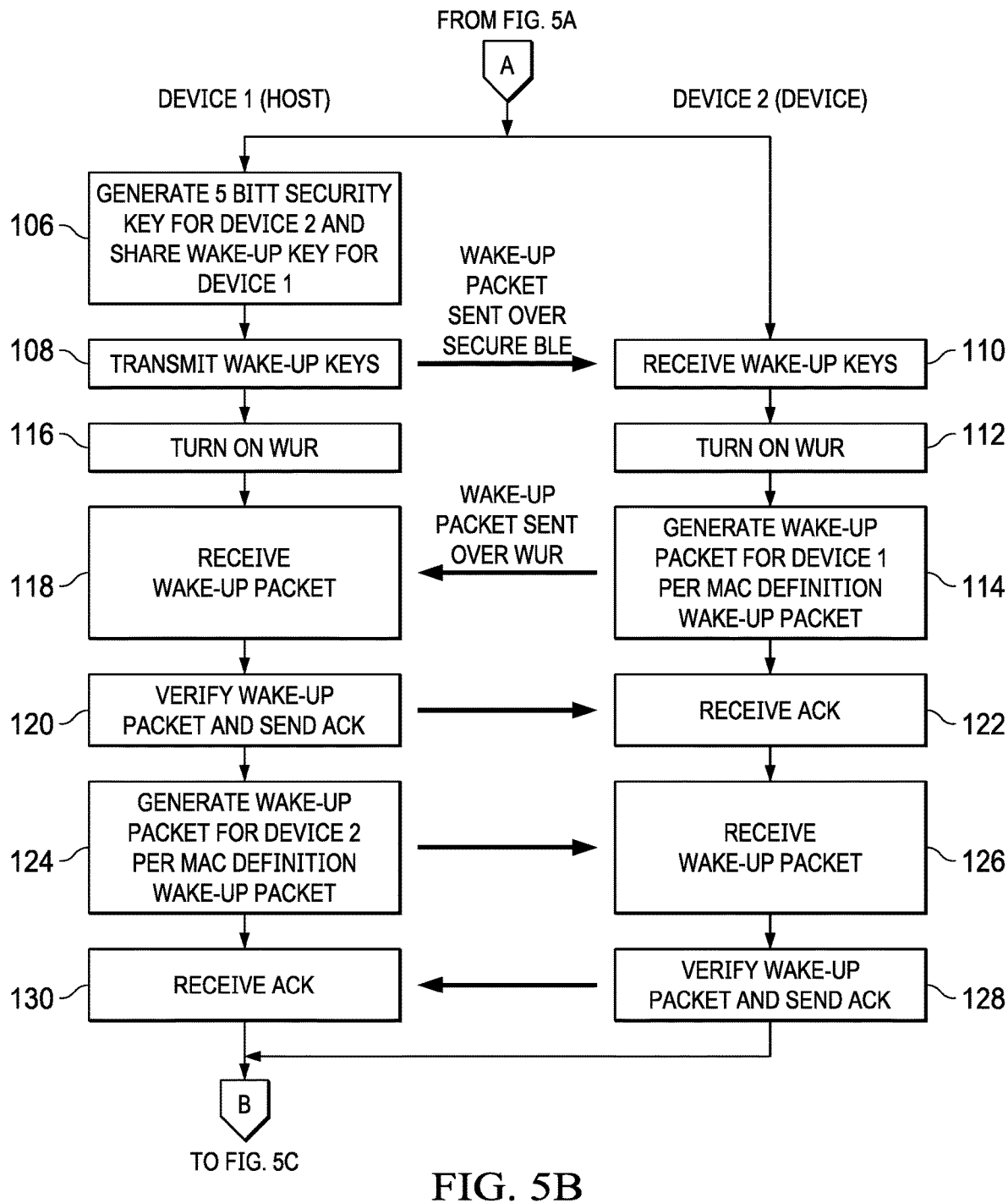

Referring now to FIG. 5B, at step 106 the host device generates a 5 bit security key for the peripheral device and shares a wake-up key with the peripheral device. At step 108 the wake-up keys are sent as BLE user data through the primary radios and received at the peripheral device at step 110. At step 112 and 116 the host and peripheral devices turn on their respective secondary radios and, at step 114 the peripheral device generates a wake command for communication by the secondary radio to the host device, such as by using the wake-up keys and device MAC addresses to define the content of a wake-up packet sent by OOK or ASK wireless signals. At step 118 the host device receives the wake command at the secondary radio and, at step 120 the host device verifies the wake command and generates an acknowledgement. At step 122 the peripheral device receives the acknowledgment and verifies the expected information. At step 124 the host device generates a wake command and transmits the wake command to the peripheral device. At step 126 the peripheral device receives the wake command and, at step 128 verifies the wake command and sends an acknowledgement to the host device. At step 130 upon receiving the acknowledgment, the host device confirms complete setup of the wake command for bi-directional wake of the host and peripheral devices. The process then continues to step 132 of FIG. 5C to determine if a configuration should be performed for a group wake command.

Figure 5C:
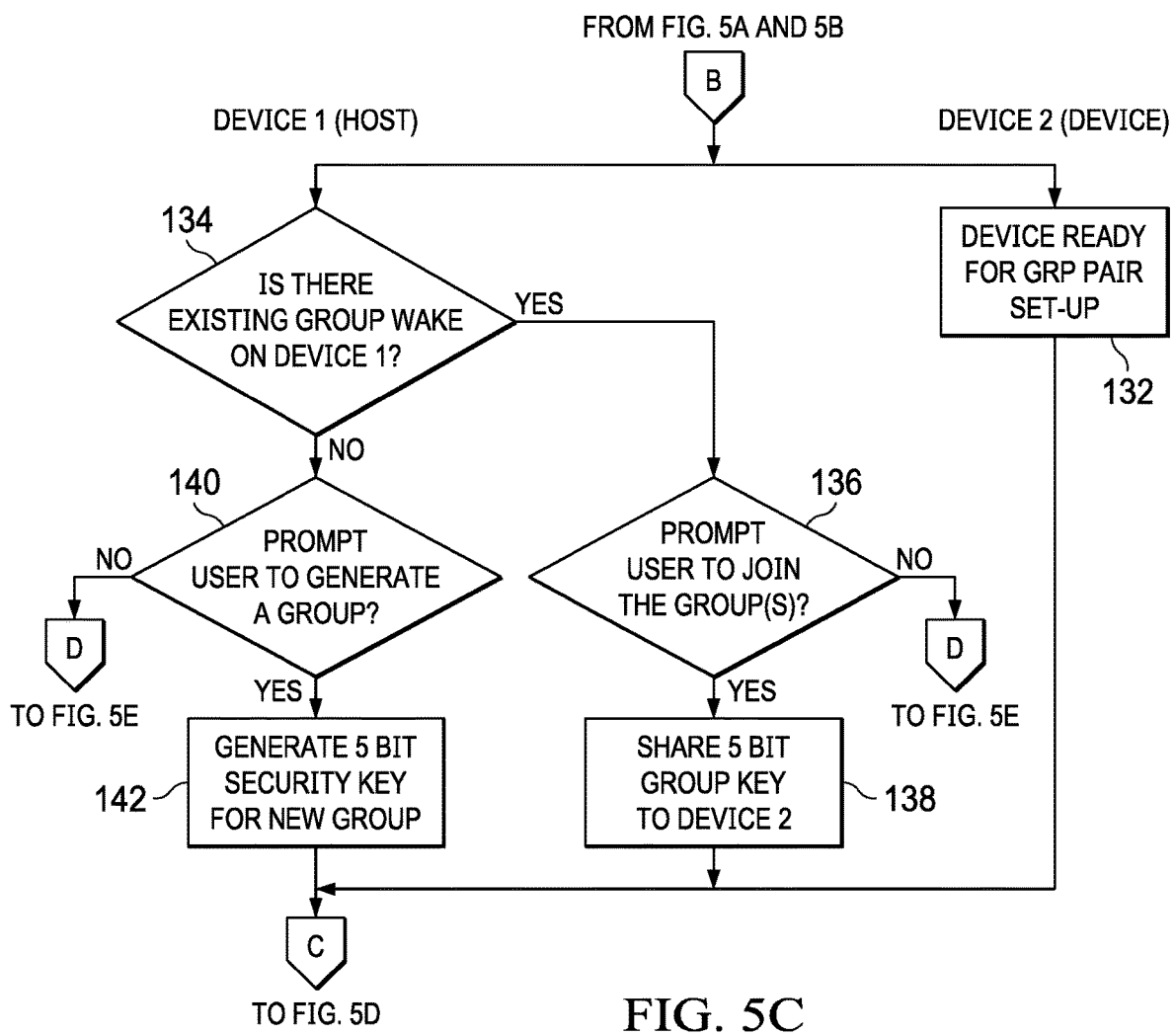

Referring now to FIG. 5C, a flow diagram depicts a process for configuration of a group wake command. The process continues to step 132 for the peripheral device when prepared to set up a group wake command and then continues to step 146 of FIG. 5D. The host device continues to step 134 to determine if there is an existing group wake command at the host device. If yes, the process continues to step 136 to prompt the end user to select whether to join the existing group. If not the process continues to step 170 of FIG. 5E. If the end user elects to join the existing group the process continues to step 138 to share the 5 bit group key for with the peripheral device. If at step 134 no group wake exists, the process continues to step 140 to prompt the user to generate a group of peripherals. If not the process continues to step 170 of FIG. 5E. If the end user elects to form a group the process continues to step 142 to generate a 5 bit security key for the new group and continues to step 144 of FIG. 5D. In one alternative embodiment, at step 132 a group may be defined around plural peripheral devices independent of an information handling system, such as by associating a keyboard and a mouse by a group wake command that either the keyboard or mouse can initiate separate from an information handling system.

Figure 5D:
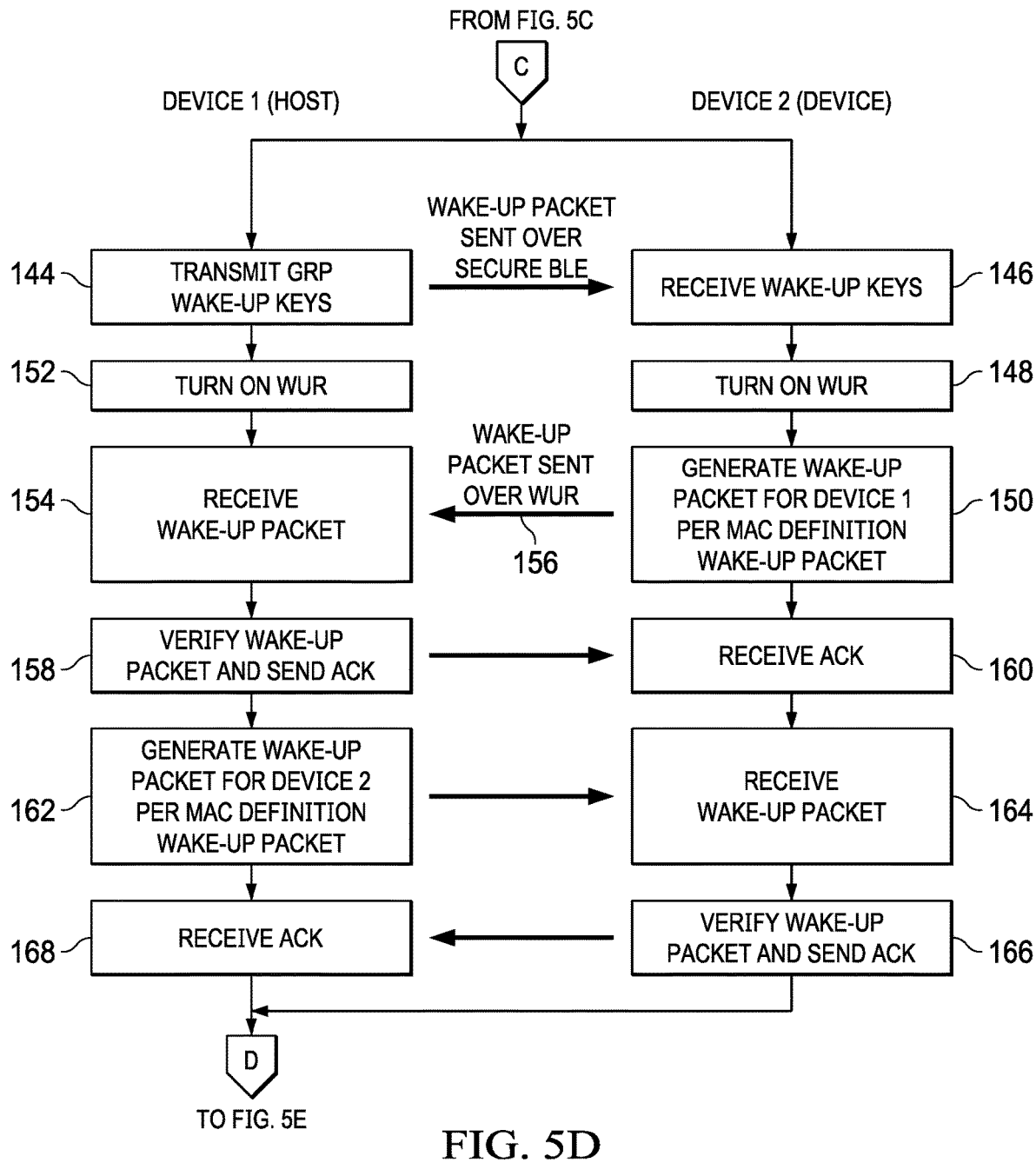

Referring now to FIG. 5D, a flow diagram depicts configuration of group wake command. The process starts at step 144 with transmission of the group wake command keys through a BLE interface to the peripheral device at step 146. At step 148 the peripheral device turns on its wake-up secondary radio and at step 150 generates a group wake command to communicate to the host device. At step 154 the host device receives the wake command and at step 158 verifies the group wake command and sends an acknowledgement, which is received at the peripheral device at step 160. At step 162 the host device generates a group wake command and transmits the group wake command to the peripheral device at step 164. At step 166 the peripheral device verifies the wake command and transmits an acknowledgement to the host device at step 168, which verifies completion of the verification. Although the process relates devices in defined groups, in alternative embodiments, the groups could be defined on an area basis. For example, a cube might have a keyboard, mouse, printer and display that interface through wireless signals and are associated based upon their area so that an end user interaction with one device may wake all other devices in a defined area.

Figure 5E:
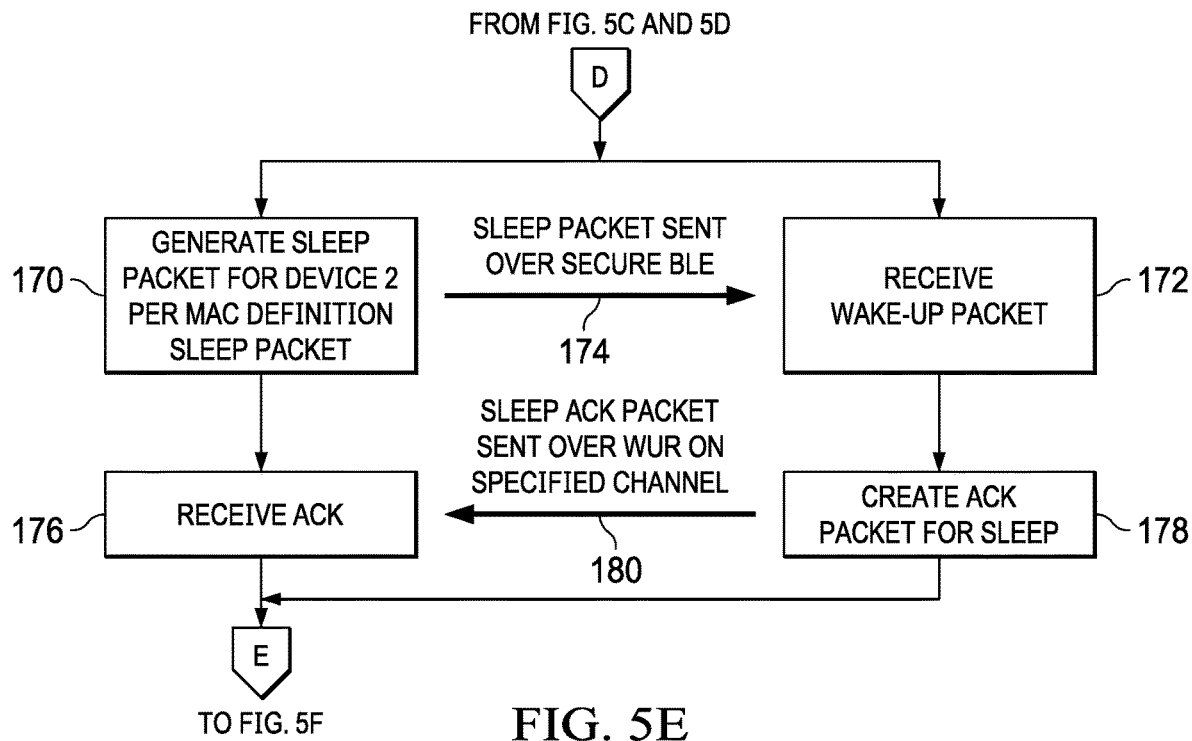
Figure 5F:
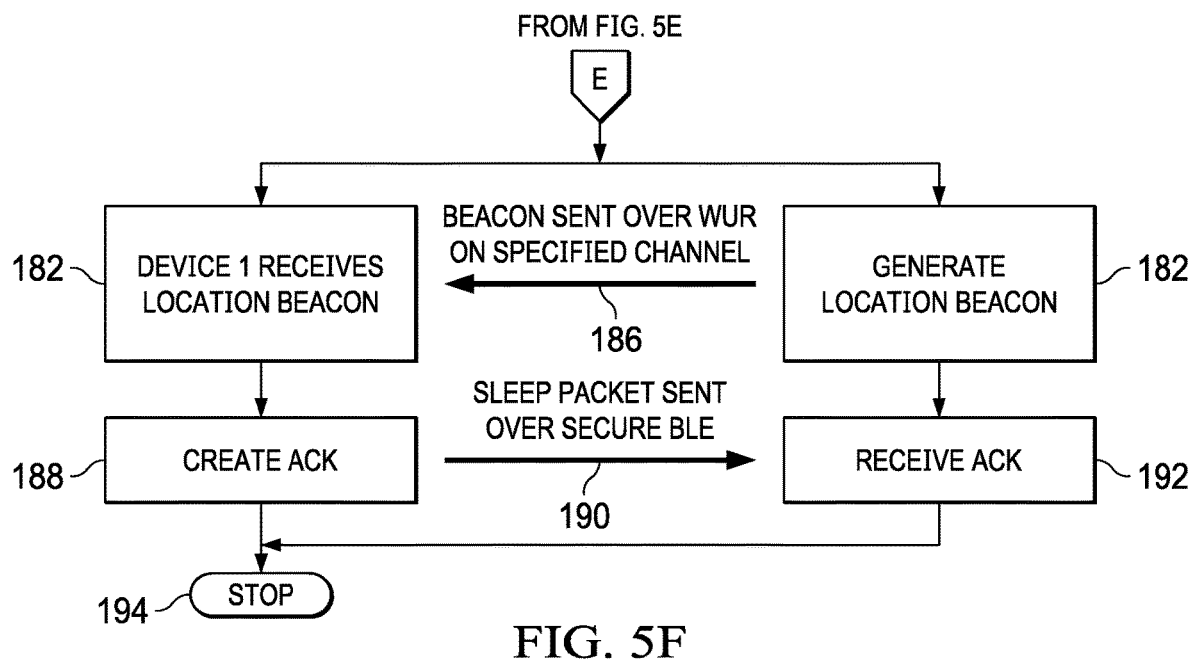

Referring now to FIG. 5E, a flow diagram depict a process for setting up a sleep command at a peripheral. At step 170, the host device generates a sleep command for the peripheral device based upon the pairing information and wake command key. The sleep command is transmitted to the peripheral device at step 174 through the BLE interface and received at step 172. In response at step 178 the peripheral device generates an acknowledgement packet to transmit at step 180 through the secondary radio using the wake protocol. At step 176 the host device receives the acknowledgement to confirm the sleep configuration. The process then continues to step 182 of FIG. 5F to set up a location beacon if desired. At step 182 the peripheral device generates a location beacon sent with the secondary a radio at step 186 with the wake protocol. At step 184 the host device receives the location beacon and at step 188 generate an acknowledgement for transmission through the primary radio at step 190 for communication to the peripheral device, which receives the acknowledgement at step 192. The process ends at step 194 with the host and peripheral devices configured for communication supported by the low power wake-up secondary radio. In various embodiment, variations to the configuration may be done. For instance, instead of exchanging wake command keys, the BLE security may be used and the BLE pairing information may be hashed or otherwise adapted to provide a unique wake command. The unique wake command may include a unique preamble to help further reduce power consumption by reading irrelevant radio signals. The wake command may provide a capability exchange inserted by default in all wake protocol packets. Alternatively, conditional information insertion may depend on mode indication bits. In another embodiment wake packets may be defined without capability exchange inserted with a pre-promised condition between receive and transmit. Although the example embodiment describes a setup configuration through BLE, other protocols may be used, such as WLAN protocols.

Figure 6A:
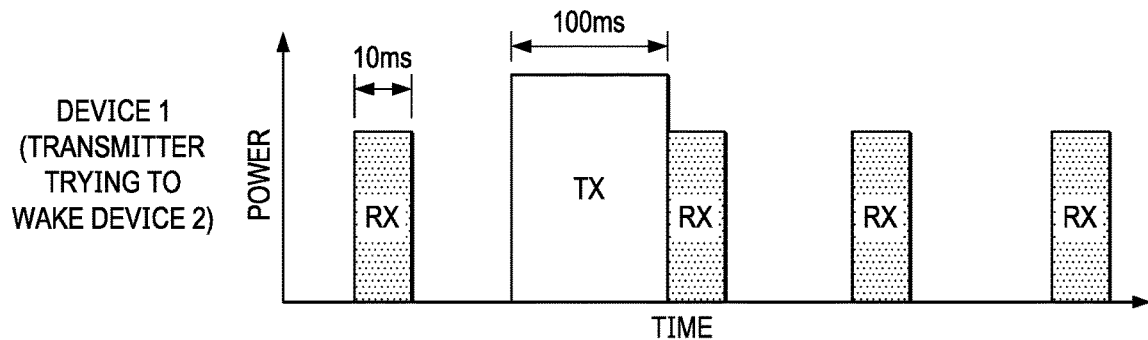
FIGS. 6A, 6B and 6C depict radio transmit and receive events that provide low power secondary radio operations.
Figure 6B:
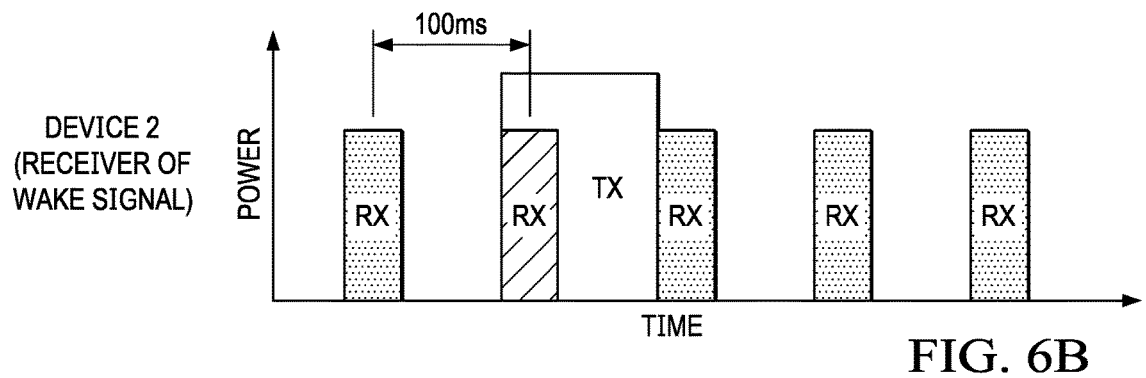
Figure 6C:
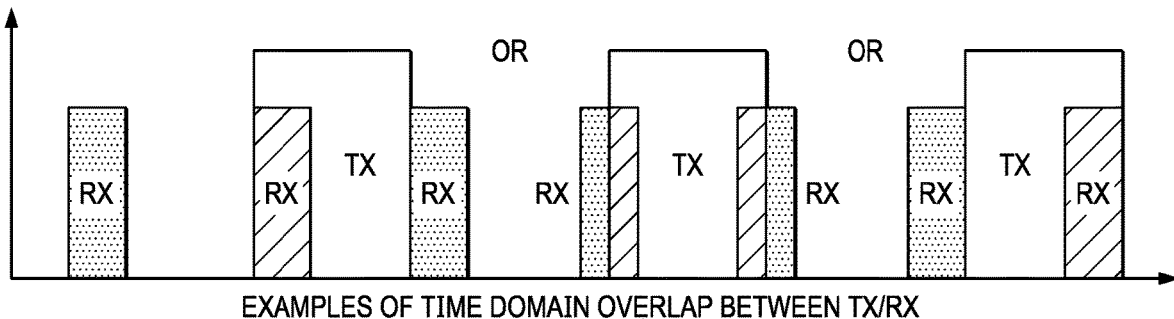

Referring now to FIGS. 6A, 6B and 6C, radio transmit and receive events are depicted that provide low power secondary radio operations. Both the primary and secondary radios have an ability to sleep in off and low power modes. Sleep in an off or low power mode reduces power consumption to near zero, such as by powering down the radio crystal or even cutting off power dissipation at the radio entirely. In a receive mode, the radio consumes an increased amount of power but less than in a transmit mode. In order to minimize power consumption, in the low power modes the secondary radios attempt to synchronize transmit and receive windows so that wake commands are more effectively monitored with minimal power consumption. One technique that helps to reduce overall power consumption is to acknowledge commands received at a primary radio with a secondary radio and vice versa. Another technique is to use a longer term transmit for the secondary radio with shorter term periodic listen windows where the wake commands are infrequent events. In contrast, the BLE protocol defines a periodic connection interval for primary radios to interface for confirming the interface and transfer of data. The secondary radio provides a lower power solution by removing logic-dependent radio control that relies upon a processing resource and initiating logic-dependent radio control when a wake event is detected.

FIG. 6A depicts an example where a 10 ms receive window is spaced every 200 ms to detect a 100 ms wake command transmission. In some example embodiments, the device that experiences the wake event may shift the transmit window over time to fall within the receive window of the sleeping device. Although the transmitting device consumes greater power than the receiving device, where wake events are dispersed over time the longer transmit window has a cumulatively reduced power consumption. The transmission may be, for example a repeat of the wake command over the transmit time period so that the receive device has a sufficient window to match the wake command against the wake command stored in an internal register. FIG. 6B depicts an overlap of the receive window and the transmit window by decreasing the interval between periodic receives at the sleeping device to at least the length of the transmission by the device having he wake event. FIG. 6C illustrates another example of overlapping receive and transmit windows that can help to extend the interval between receive windows at a sleeping device. For example, a secondary radio receives a part of a wake command that matches a part of the wake command stored in the internal register, a wake may be performed to determine with the primary radio whether the other device in fact commanded and entered a wake state.

Figure 7A:
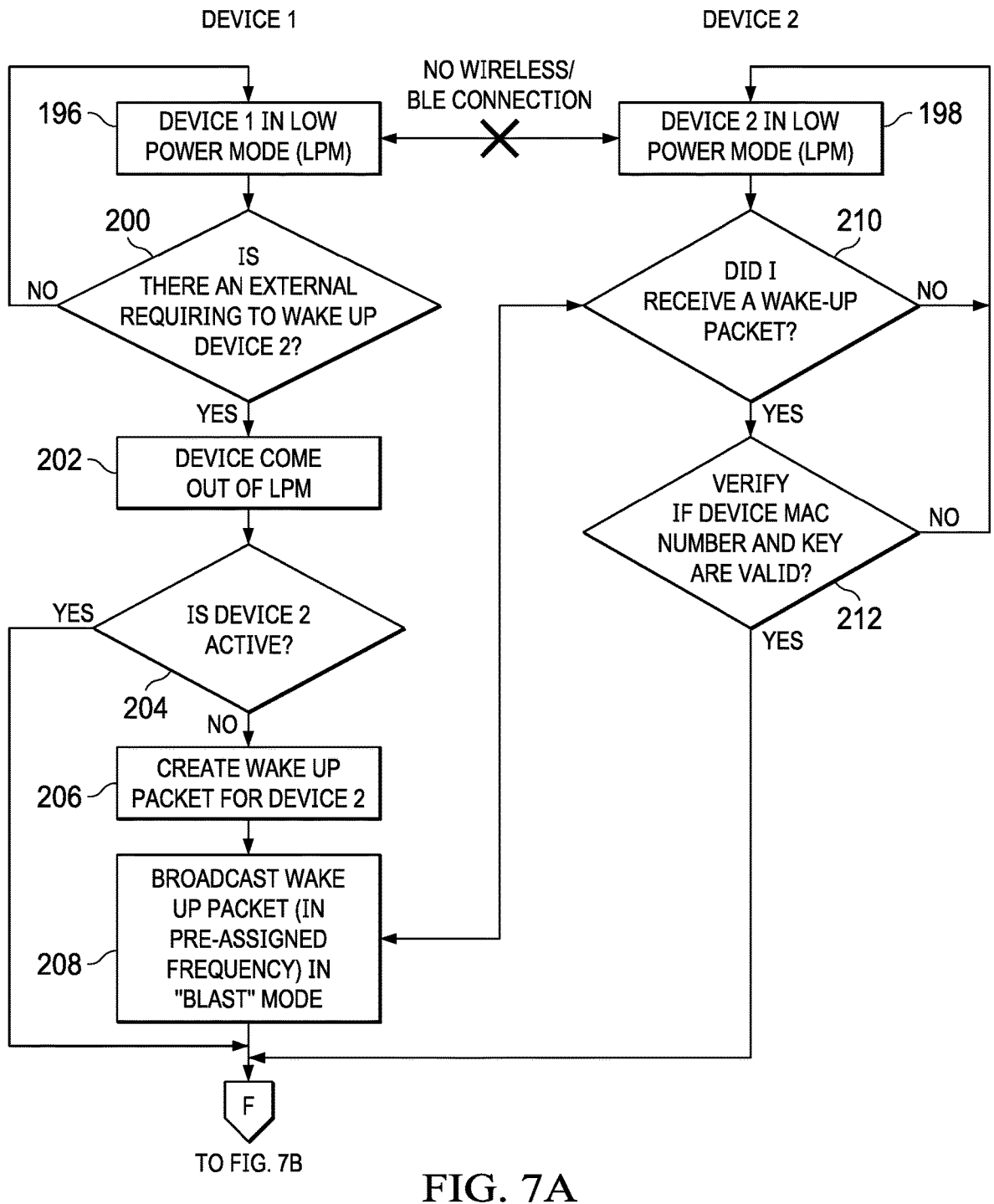
FIGS. 7A and 7B depict flow diagrams of a process to wake a device from a low power state with a wake command.
Figure 7B:
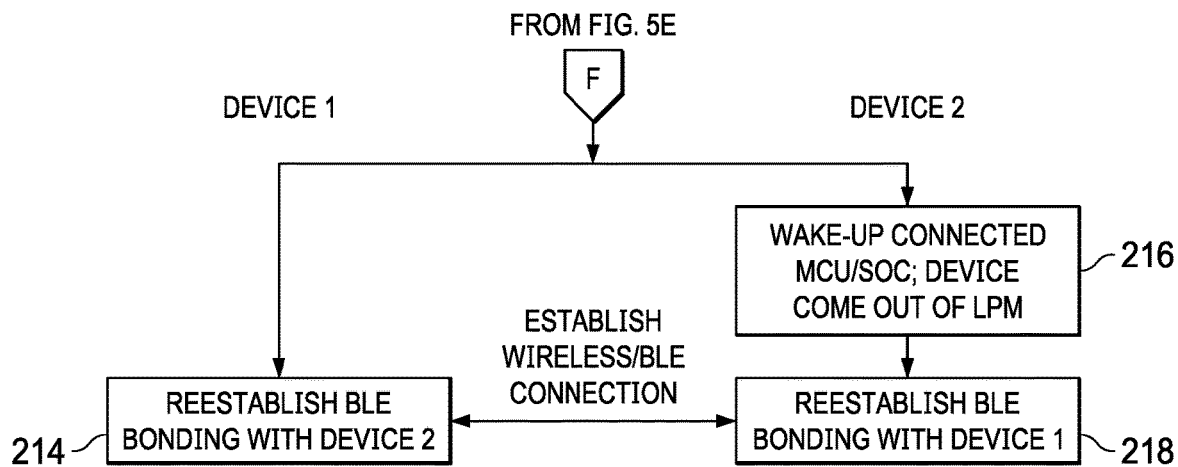

Referring now to FIGS. 7A and 7B, flow diagrams depict a process to wake a device from a low power state with a wake command. In the example embodiment, the low power device receives in short bursts to listen for a wake command transmitted for at least a length of time greater than the interval between the receives. At step 196 and 198, both devices are in a low power mode. At step 200, the first device monitors for a wake event, such as a press at a keyboard key, a movement of a mouse or a power on at an information handling system. When a wake event is detected, the process continues to step 202 to bring the first device out of the low power mode, such as by a signal at a GPIO of a processing resource or the secondary radio that commands a wake. At step 204 a determination is made of whether the second device is active or sleeping. If the second device is active, the process continues to step 214 of FIG. 7B. If the second device is sleeping, the process continues to step 206 to create a wake command packet for communication by the secondary radio. At step 208, the secondary radio broadcasts the wake command in a preassigned frequency channel is a "blast" mode that has a transmit time of greater than the second device receive window interval, as depicted by FIG. 6B. At step 210 the second device secondary radio determines if it has received a wake command and monitors for a wake command until received. Once a wake command is received, the process continues to step 212 verify if the wake command is for the second device. If not the process returns to step 198 to continue monitoring for a wake command. If the wake command is for the second device, the process continues to step 216 of FIG. 7B.

At step 214, the first device initiates BLE bonding with the second device, such as with stored pairing information. At step 216, the second device transitions from a sleep to a wake state, such as by providing a signal from the secondary radio to a GPIO of the processing resource that controls the primary radio. At step 218, the second device establishes BLE bonding with the first device, such as through advertisement and reconnection BLE protocols of the primary radio. Although the example embodiment wakes a primary radio for BLE communications, in alternative embodiments, a wake command may be specific to different types of primary radios and user data protocols. For example, the wake command may include one or more bits that specify which primary radio and protocol are woken. In one embodiment, a two bit indication can command wake BLE only (0,1), wake WiFi only (1,0), wake up both BLE and WiFi (1,1), and wake an entire system (0,0). As is described below, adjustments to the wake command may also set devices to wake as part of a group or an area. For instance, a wake command can include a two bit indication that defines which of plural devices of a group should wake, either individually or collectively.

Figure 8A:
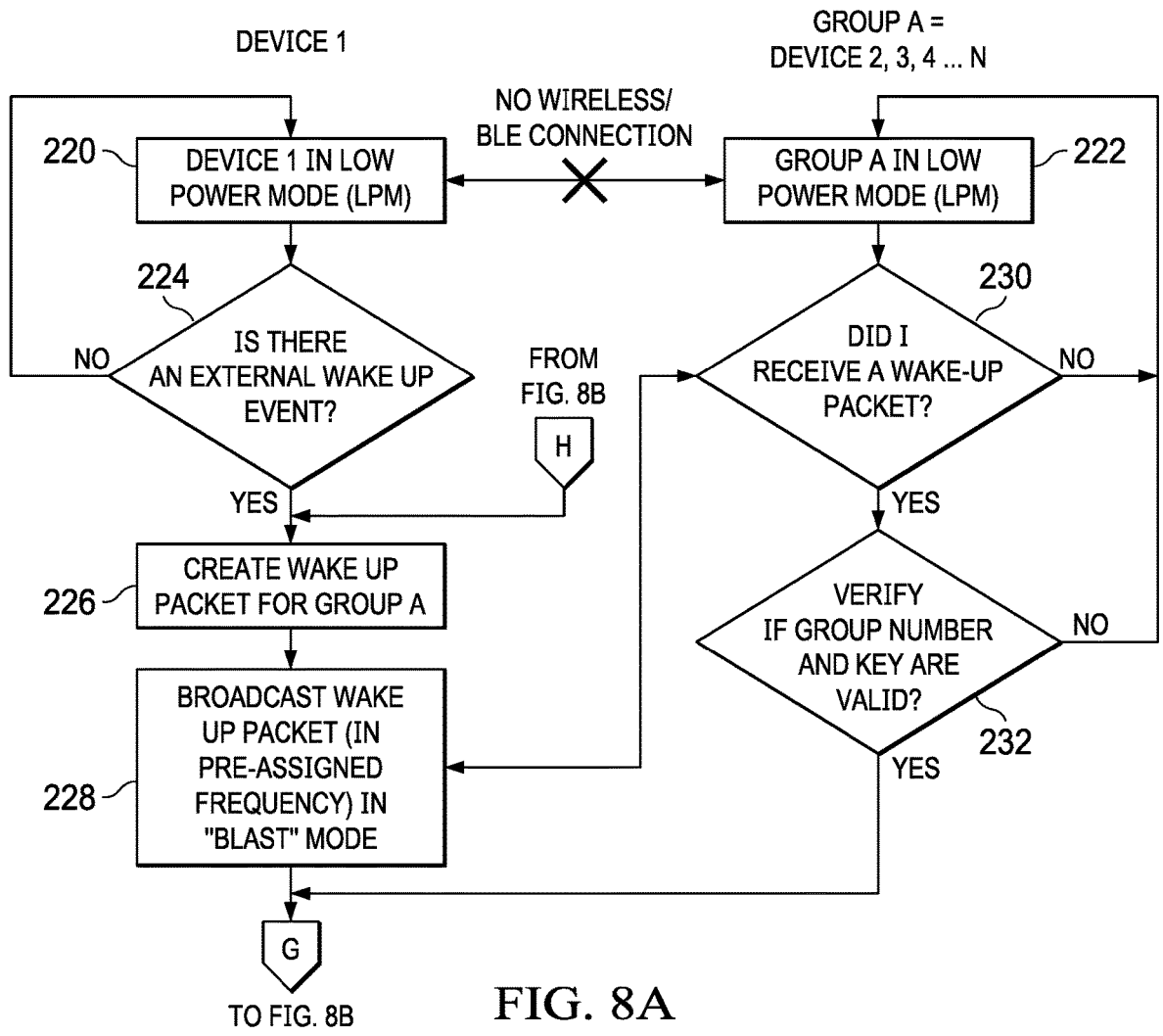
FIGS. 8A and 8B depict flow diagrams of a process for wake up of devices as a group.
Figure 8B:
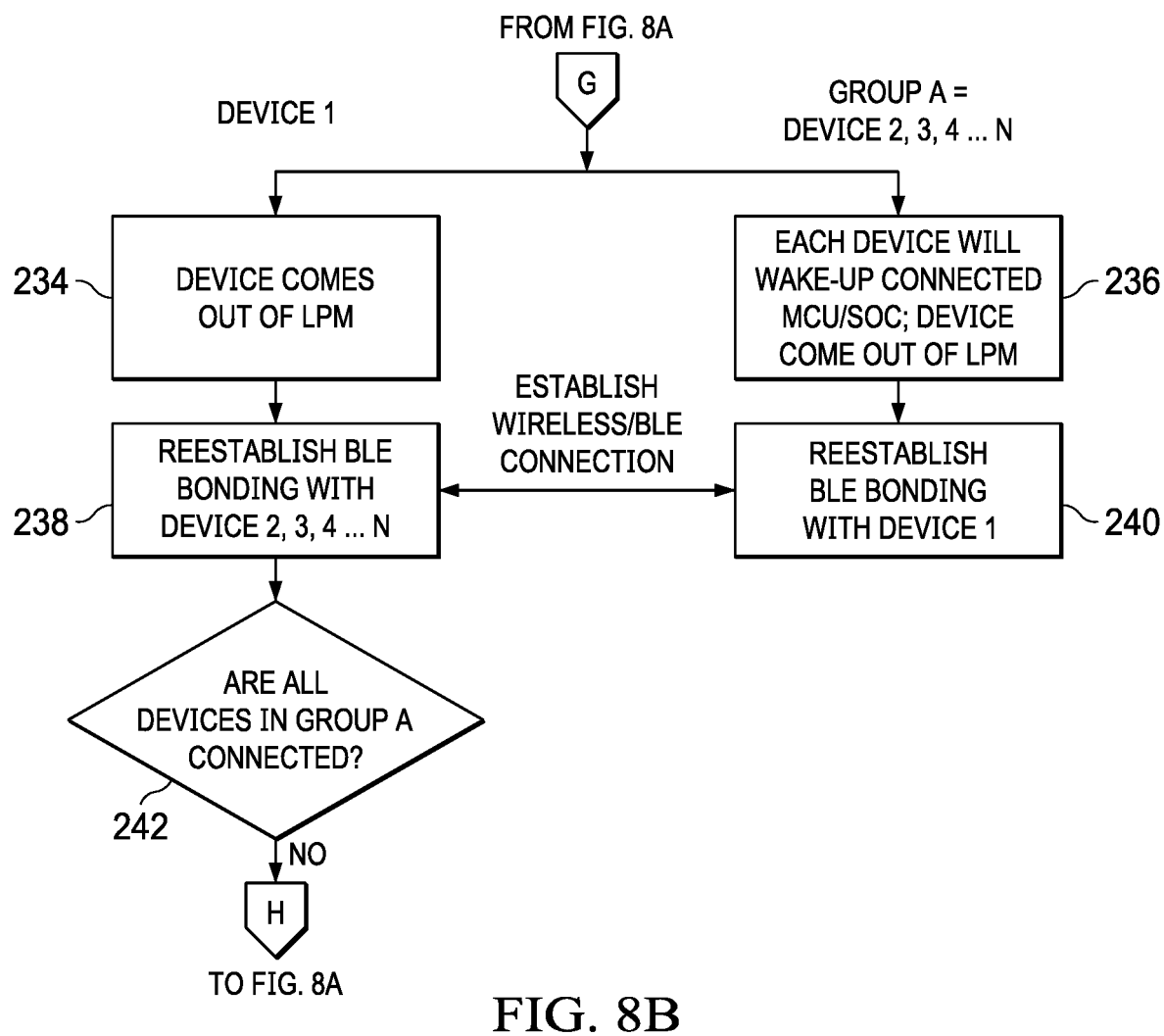

Referring now to FIGS. 8A and 8B, flow diagrams depict a process for wake up of devices as a group. The process starts at step 220 with a first device in a low power mode and step 22 with a group of devices 2 through N in a low power mode. At step 224 the first device monitors for an event that indicates a transition to a wake state and, when an event is detected, continues to step 226 to generate a wake command for the group of devices 2 through N. At step 228, the first device transmits the group wake command for a time period of greater than the interval between receive windows of the group of devices. After broadcast of the group wake command, the process continues to step 234 of FIG. 8B. At step 222 the group of devices are in a low power mode with at step 230 a periodic determination of receiving of the wake command. Once the wake command is determined, the process continues to steps 232 to verify that the wake command is for the device and/or a group to which the device is assigned. If so the process continues to step 236 of FIG. 8B.

At step 234 the first device comes out of the low power mode and powers the primary radio. At step 236, each of the devices of the group wake from the low power mode at receive of the group wake command. At step 238 and 240 the first device establishes BLE bonding with each device of the group using the primary radio user data protocol. At step 242 a determination is made of whether all of the devices of the group are awake, such as by the acknowledgement received through the primary radios. If not, the process returns to step 226 to attempt to wake remaining devices, either with another group wake command or with individual wake commands. As described above, the transition to an on state may relate to BLE only, WiFi only, or both radios, as well as to different types of wake states at each device as specified by the wake command or subsequent BLE communications.

Figure 9A:
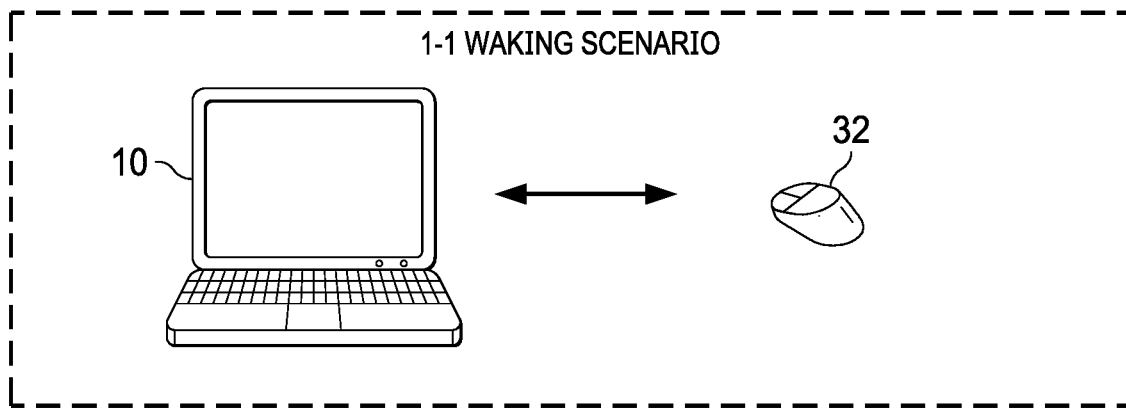
FIGS. 9A, 9B and 9C depict examples of wake commands between an information handling system and plural peripherals.
Figure 9B:
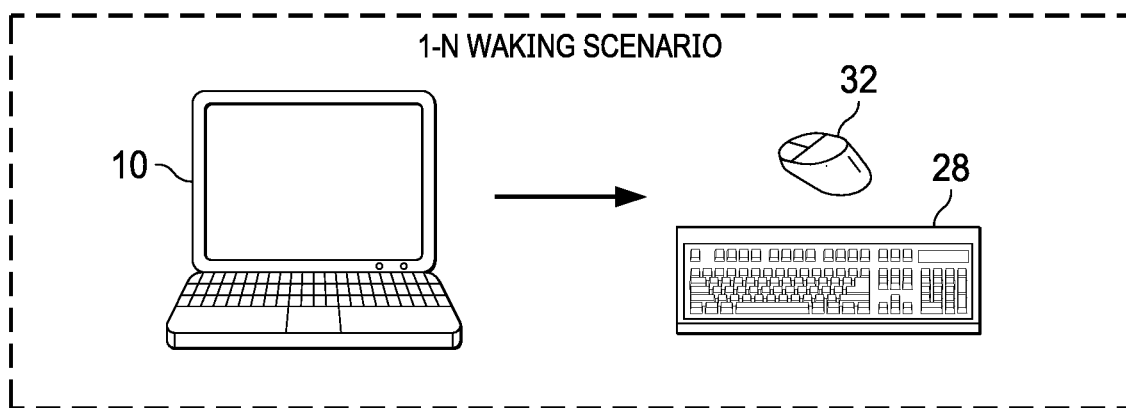
Figure 9C:
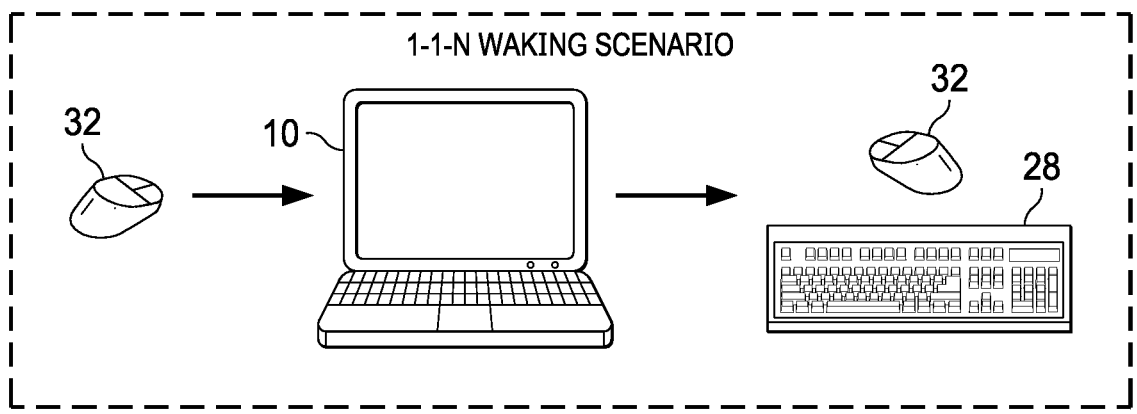

Referring now to FIGS. 9A, 9B and 9C, examples of wake commands are depicted between an information handling system and plural peripherals. FIG. 9A depicts a one-to-one wake scenario where one device that detects a wake event transmits a wake command to another device, such as an information handling system 10 waking a mouse 32 at power up or a mouse waking an information handling system when movement is detected. FIG. 9B depicts a one-to-many wake scenario where an information handling system 10 wakes keyboard 28 and mouse 32, such as a broadcast wake command transmitted at power up of information handling system 10. FIG. 9C depicts a one-to-one-to-many scenario where a mouse 32 issues a wake command to information handling system 10 and then information handling system 10 wakes a group of devices associated with it, such as a keyboard 28 and mouse 32. The trigger to wake of FIG. 9C may extend to situations where an area around of an information handling system is transitioned to wake or where a wake command at one device triggers a wake from that device to other devices as a relay, essentially hopping between associated devices and groups of devices.

Figure 10:
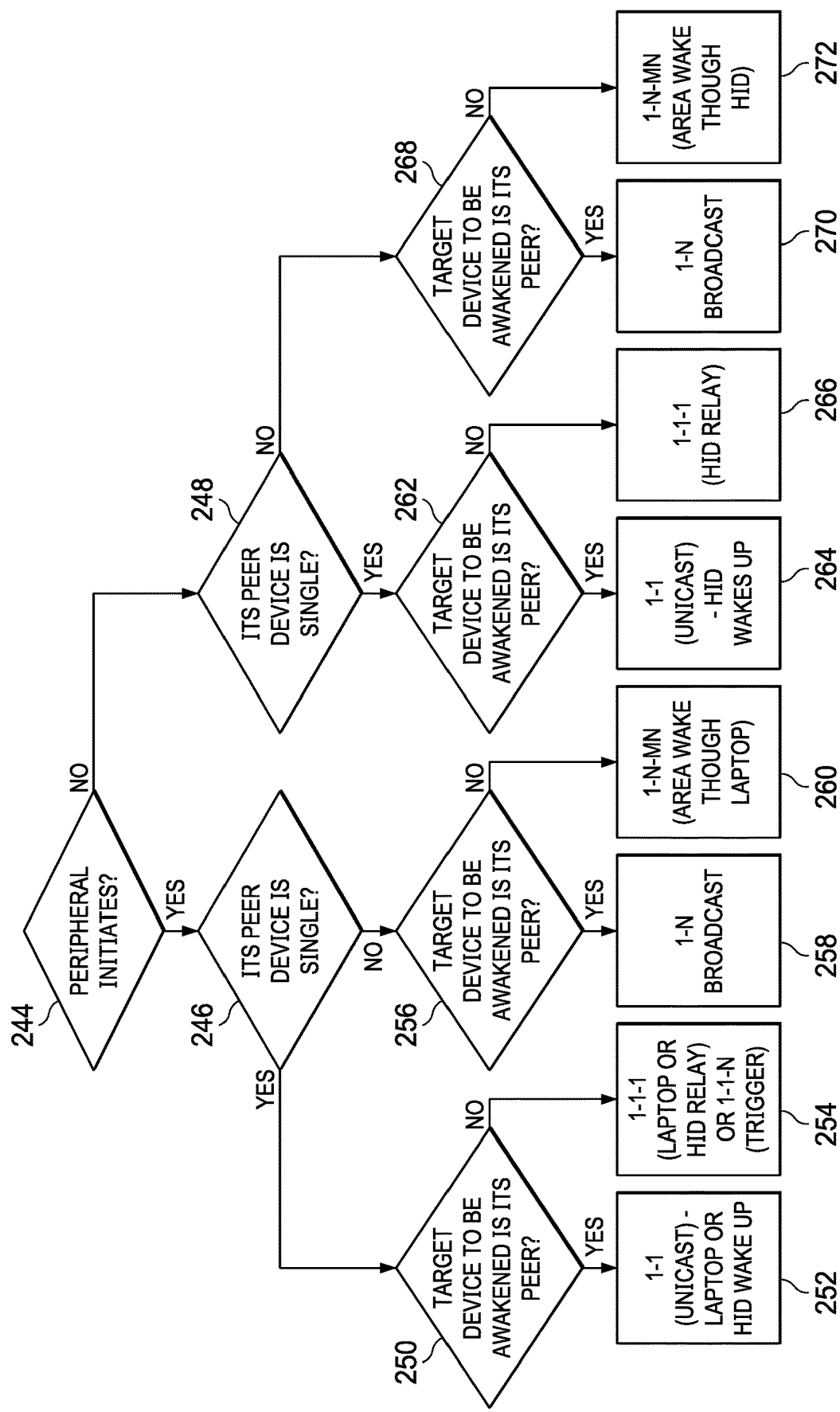
FIG. 10 depicts a flow diagram of a process for distribution of wake commands between plural devices.

Referring now to FIG. 10, a flow diagram depicts a process for distribution of wake commands between plural devices. The process starts at step 244 with a determination that a wake is initiated by a peripheral. If so the process continues to step 246, if not to step 248. At steps 246 and 248 a determination is made of whether a peer device associated with wake is a single device. If yes, the process continues to steps 250 and 262 where a determination is made of whether the target of the wake command is the peer device. If so, the process continues to step 252 and 264 to perform a one-to-one wake command to the peer device. If not, the process continues to step 254 and 266 to perform a relay of one-to-one-to-one to wake the target devices, such as mouse to an information handling system to a target keyboard. If at steps 246 and 248 the peer device is not a single device, the process continues to steps 256 and 268 to determine if the target device is the peer. If so, a one-to-one wake is commanded at steps 258 and 270. If not, a one-to-one-to an area is commanded at step 260 and 272. In various embodiments, wake-up secondary radios may be pre-programmed for desired wake scenarios that coordinate a desktop operational space, such as managed power states at plural information handling systems, input devices, displays, speakers, printers, etc . . . .

Referring now to FIGS. 11A and 11B, examples of broadcast packets associated with a location peripheral device are depicted. A location peripheral device establishes radio communication with other devices so that the position of the other devices helps to locate the location peripheral device. Minimal battery consumption is an important concern for such location peripheral devices so that minimal receive and transmit windows are a consideration. Including a secondary radio in a location peripheral device provides an advantage of reduced power consumption and also allows the location device to interact with other peripheral devices, such as through a relay to host devices. FIG. 11A depicts an example of a location peripheral device transmission packet that had a recent connection, such as within the past 24 hours. In the example embodiment, the location peripheral transmits a packet every second so that over an extended period of time another peripheral will overlap with the transmission to locate the location peripheral device. FIG. 11B depicts an example of location peripheral device packet broadcasts after a failure to connect for a defined intermediate time, such as 24 hours to a week. The location beacon transmission time is decreased to 500 msec. In one example embodiment, the location packet after a recent connection may simply include the device identifier, such as the BLE MAC address while the location packet after an intermediate time since the last contact may include a time stamp. Including the time stamp allows peripheral devices that detect the location packet to store the device ID and time stamp so that the peripheral devices may relay the contact information to an information handling system when next in use. In another example a location packet may be transmitted differently where a last contact occurred an extended time ago, such as greater than a week. In the example embodiment, the location packet is sent every five minutes with the device identifier and a time stamp. In various embodiments, the location peripheral device may rely on only the secondary radio to transmit location or may include a primary radio and processing resource that cooperate at connections to adapt the configuration of the location beacons.

Figure 12:
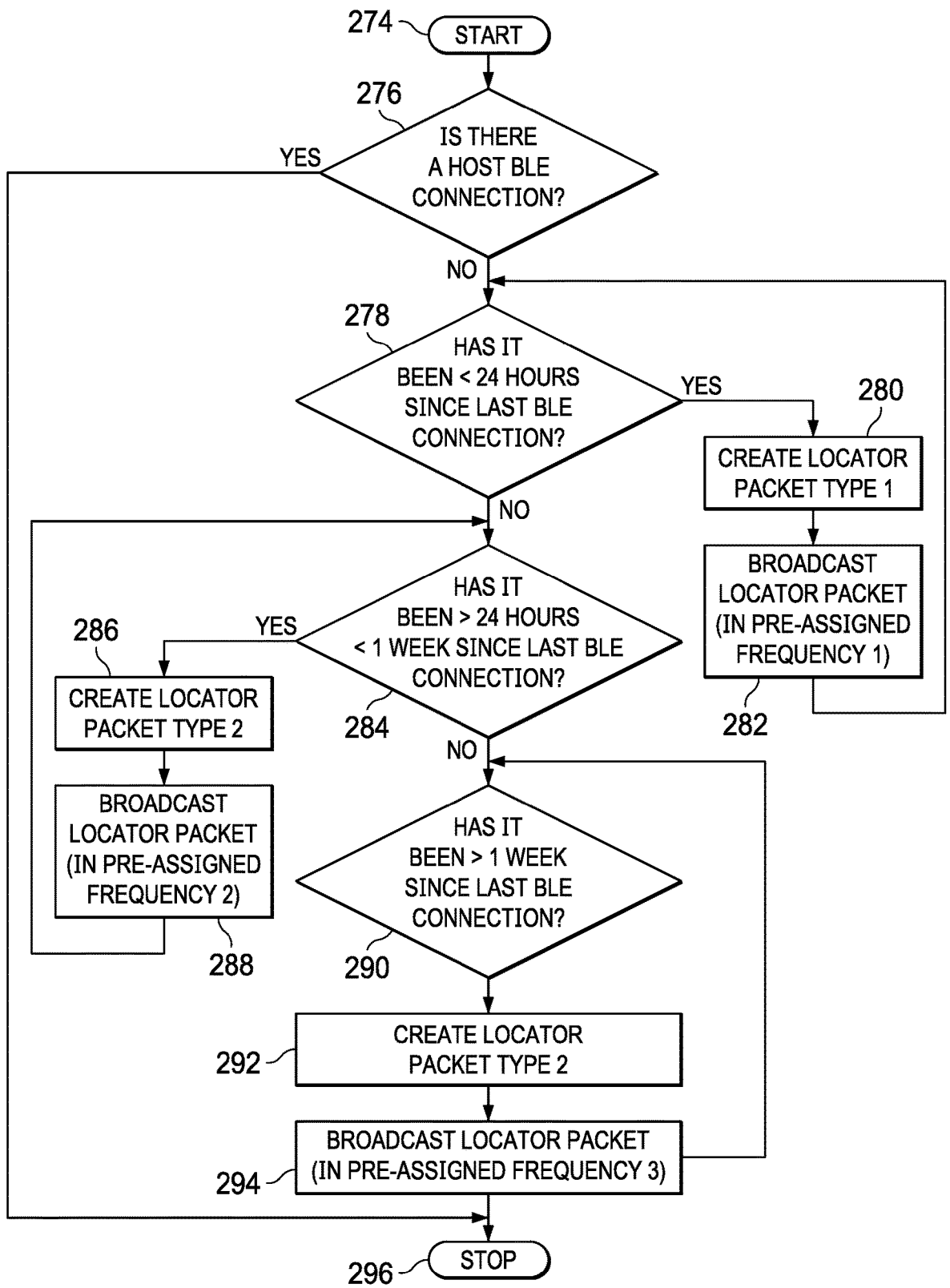
FIG. 12 depicts a flow diagram of a process for a time based location packet transmission.

Referring now to FIG. 12, a flow diagram depicts a process for a time based location packet transmission. The process starts at step 274 and continues to step 276 to determine if a BLE connection exists with the primary radio. If yes, the process ends at step 296 where the update for the position and communication to the network location is performed through the BLE interface. If no BLE connection exists at step 276, the process continues to step 278 to determine if the last BLE connection was within a short defined time period, such as less than 24 hours ago. If so, the process continues to step 280 to define a location packet for transmission of the short time period and to step 282 at which the packet is transmitted. Successful interactions by the secondary radio can result in establishment of a BLE interface to update a network location, such as a cloud storage location. In one example embodiment, an accelerometer in the location peripheral device may be used to track changes in position indicated by accelerations, so that the location beacon timing may be adjusted after reporting a position to a cloud location since the location will not change without detection of an acceleration. From step 282 the process repeats to send the location beacon until the intermediate time period is detected at step 278 and the process continues to step 284 to apply the intermediate time period transmission pattern. At step 284 a determination is made of whether the last interface by the primary radio, such as with BLE, was greater than 24 hours and less than a week. If so the process continues to step 286 to generate a packet having the intermediate time period configuration and to step 288 to broadcast the intermediate time period packet. If a connection is established by the primary radio, the location information is updated to the network location and the process starts again at step 274. If a connection is not made, the process returns to step 284 until the intermediate time period passes of greater than one week, and then continues to step 290. At step 290 if the time from the last contact is greater than a week, the process continues to step 292 to generate a location beacon associated with an extended time since reporting a position. At step 294 the extended time location beacon is transmitted. The process continues from step 290 until a BLE connection is established and then returns to the start at step 274.

Figure 13:
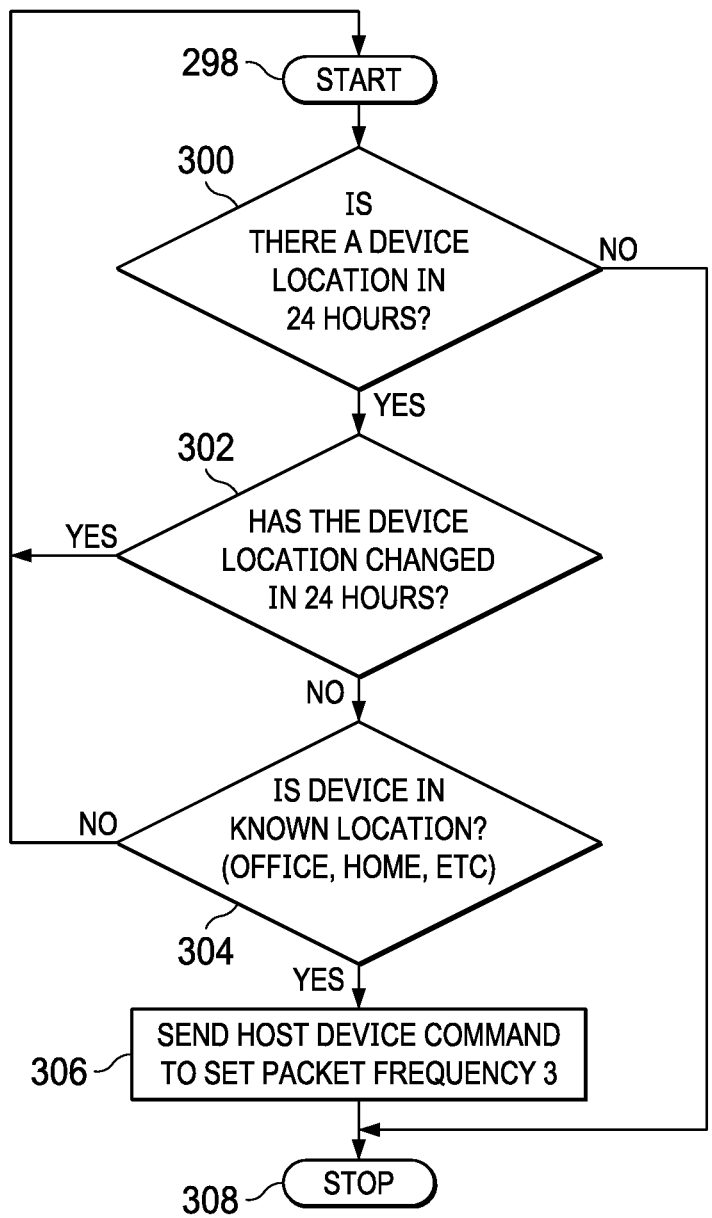
FIG. 13 depicts a flow diagram of a network location packet transmission configuration.

Referring now to FIG. 13, a flow diagram depicts a network location packet transmission configuration. The process starts at step 298 and at step 300 determines if the device has reported location within the short term period, such as the last 24 hours. If not, the process stops at step 308. If the device location was reported in the last 24 hours, the process continues to step 302 to determine if the device location has changed in the last 24 hours. If the position has changed, the process returns to step 298. If at step 302 the position was reported in less than 24 hours and has not changed for 24 hours, the process continues to step 304 to determine if the location peripheral is in a known location, such as a home or office. If not, the process returns to step 298. If the location peripheral device is in a known location, the process continues to step 306 for the host to send to the location peripheral device a command that sets the location beacon transmission frequency to the extended time transmission profile. The more extended times between location beacons reduces battery charge consumption while the location peripheral device is in a location where it is less likely to become lost. The process then ends at step 308.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions to process information;
   a memory disposed in the housing and interfaced with the processor, the memory operable to store the instructions and information;
   a wireless interface module having a primary radio, a secondary radio and a processing resource; and
   a peripheral device separate from the housing and configured to perform a peripheral function, the peripheral device including a peripheral wireless interface module having a peripheral primary radio, a peripheral secondary radio and a peripheral processing resource; and
   a non-transient memory integrated in the peripheral device and storing instructions that when executed on the peripheral processing resource:
   selectively sleep the peripheral primary radio;
   in response to the selectively sleep, power up the peripheral secondary radio to monitor for a predetermined wireless signal, the peripheral secondary radio having a GPIO interface with the peripheral processing resource that activates in response to the predetermined wireless signal;
   in response to the power up the peripheral secondary radio, sleep the peripheral processing resource; and
   in response to a GPIO activate signal from the peripheral secondary radio, wake the peripheral processing resource, wake the peripheral primary radio and sleep the peripheral secondary radio.

2. The information handling system of claim 1 further comprising:
   a non-transient memory integrated in the housing and storing instructions that when executed on the peripheral processing resource:
   selectively sleep the primary radio;
   in response to the selectively sleep, power up the secondary radio to monitor for a predetermined wireless signal, the secondary radio having a GPIO interface with the processing resource that activates in response to the predetermined wireless signal;
in response to the power up the peripheral secondary radio, sleep the peripheral processing resource; and
in response to a GPIO activate signal from the secondary radio, wake the peripheral processing radio, wake the primary radio and sleep the secondary radio.

3. The information handling system of claim 1 wherein the peripheral primary radio communicates information with a first wireless protocol and the peripheral secondary radio only communicates the predetermined wireless signal.

4. The information handling system of claim 3 wherein the first wireless protocol comprises a wireless personal area network and the predetermined wireless signal comprises information modulated with an On-Off Keying protocol.

5. The information handling system of claim 3 wherein the first wireless protocol comprises a wireless local area network and the predetermined wireless signal comprises information modulated with an Amplitude-Shift Keying protocol.

6. The information handling system of claim 1 wherein the instructions further:
receive through the peripheral primary radio information that identifies the predetermined wireless signal; and
stores the information that identifies the predetermined wireless signal in non-transitory memory of the peripheral secondary radio.

7. The information handling system of claim 6 wherein the predetermined wireless signal comprises predetermined preamble parameters.

8. The information handling system of claim 6 wherein predetermined wireless signal comprises a MAC address of the wireless interface module.

9. The information handling system of claim 1 wherein the peripheral comprises a mouse.

10. A method for managing information handling system peripheral power, the method comprising:
selectively sleeping a peripheral primary radio with a peripheral processing resource;
in response to the selectively sleeping, powering up a peripheral secondary radio to monitor for a predetermined wireless signal, the peripheral secondary radio having a GPIO interface with the peripheral processing resource that activates in response to the predetermined wireless signal;
in response to the powering up the peripheral secondary radio, sleeping the peripheral processing resource; and
in response to a GPIO activate signal from the peripheral secondary radio, waking the peripheral processing resource, waking the peripheral primary radio and sleeping the peripheral secondary radio.

11. The method of claim 10 further comprising:
receiving through the peripheral primary radio information defining the predetermined wireless signal; and
storing the information defining the predetermined wireless signal in non-transient memory of the peripheral secondary radio.

12. The method of claim 11 further comprising:
communicating user inputs detected at the peripheral to the information handling system through the primary radio; and
communicating the predetermined wireless signal to the peripheral only through the peripheral secondary radio.

13. The method of claim 12 further comprising:
communicating the user inputs with a wireless personal area network protocol; and
communicating the user inputs with an On-Off Keying protocol.

14. The method of claim 10 further comprising:
in response to the GPIO activate signal, commanding with the processing resource an acknowledge wireless signal from the peripheral secondary radio; and
sleeping the peripheral secondary radio after the acknowledge wireless signal is transmitted.

15. The method of claim 14 further comprising:
sending the predetermined wireless signal from a primary radio integrated in the information handling system to the peripheral secondary radio;
receiving the acknowledgement at the primary radio; and
in response to the receiving the acknowledgement, reprogramming the primary radio for communication of the user inputs from the peripheral primary radio.

16. The method of claim 10 further comprising:
detecting a user input at the peripheral when the peripheral processing resource is sleeping;
in response to the detecting a user input, waking the peripheral processing resource; and
commanding with the peripheral processing resource transmitting of the predetermined wireless signal from the peripheral secondary radio.

17. The method of claim 16 wherein the peripheral comprises an Internet of things device.

18. A peripheral comprising:
a housing having an input device configured to accept inputs from a user;
a peripheral processing resource interfaced with the input device to generate user input information from the inputs;
a peripheral primary radio disposed in the housing and interfaced with the peripheral processing resource and operable to transmit the user input information with a first wireless protocol;
a peripheral secondary radio interfaced with the peripheral processing resource and operable to receive a wake signal; and
non-transitory memory interfaced with the peripheral processing resource and storing instructions that when executed on the peripheral processing resource:
selectively sleep the peripheral primary radio;
in response to the selectively sleep, power up the peripheral secondary radio to monitor for a the wake signal, the peripheral secondary radio activating the peripheral processing resource from a sleep state in response to the predetermined wireless signal;
in response to the power up the peripheral secondary radio, sleep the peripheral processing resource; and
in response to the activating from the peripheral secondary radio, wake the peripheral processing resource, wake the peripheral primary radio and sleep the peripheral secondary radio.

19. The peripheral of claim 18 further comprising:
an antenna interfaced with both the peripheral secondary radio and the peripheral primary radio;
wherein the input information is transmitted only from the peripheral primary radio and the wake signal is only received with the peripheral secondary radio.

20. The peripheral of claim 18 wherein:
the input device inputs wake the peripheral processing resource from sleep: and
the instructions command the peripheral secondary radio to transmit the wake signal in response to input device inputs that wake the peripheral processing resource.

* * * * *